(12) United States Patent
Tselesin

(10) Patent No.: US 6,453,899 B1
(45) Date of Patent: Sep. 24, 2002

(54) METHOD FOR MAKING A SINTERED ARTICLE AND PRODUCTS PRODUCED THEREBY

(75) Inventor: Naum N. Tselesin, Atlanta, GA (US)

(73) Assignee: Ultimate Abrasive Systems, L.L.C., Atlanta, GA (US)

( * ) Notice: Subject to any disclaimer, the term of this patent is extended or adjusted under 35 U.S.C. 154(b) by 0 days.

(21) Appl. No.: 09/444,840

(22) Filed: Nov. 22, 1999

Related U.S. Application Data

(60) Continuation-in-part of application No. 09/055,217, filed on Apr. 6, 1998, now Pat. No. 6,273,082, which is a division of application No. 08/480,715, filed on Jun. 7, 1995, now Pat. No. 5,791,330.

(60) Provisional application No. 60/109,730, filed on Nov. 23, 1998.

(51) Int. Cl.[7] .............................. B24D 5/14; B28D 1/02
(52) U.S. Cl. ............................ 125/15; 51/307; 451/542
(58) Field of Search ......................... 125/15; 451/540, 451/542; 407/118, 119; 175/327, 430–434, 426–428; 51/307, 309

(56) References Cited

U.S. PATENT DOCUMENTS

| | | | |
|---|---|---|---|
| 4,481,016 A | 11/1984 | Campbell et al. | 51/295 |
| 4,525,179 A * | 6/1985 | Gigl | 51/309 |
| 4,793,828 A | 12/1988 | Burnand | 51/293 |
| 4,925,457 A | 5/1990 | deKok et al. | 51/293 |
| 5,049,165 A | 9/1991 | Tselesin | 51/295 |
| 5,092,910 A | 3/1992 | DeKok et al. | 51/295 |
| 5,096,465 A * | 3/1992 | Chen et al. | 51/295 |
| 5,147,001 A * | 9/1992 | Chow et al. | 175/428 |
| 5,190,568 A | 3/1993 | Tselesin | 51/293 |
| 5,203,880 A | 4/1993 | Tselesin | 51/293 |
| 5,215,072 A | 6/1993 | Scott | 125/21 |
| 5,238,074 A * | 8/1993 | Tibbitts et al. | 175/428 |
| 5,518,443 A * | 5/1996 | Fisher | 451/540 |
| 5,791,330 A | 8/1998 | Tselesin | 125/15 |
| 6,039,641 A | 3/2000 | Sung | 451/540 |

FOREIGN PATENT DOCUMENTS

| | | |
|---|---|---|
| EP | 0 086 086 | 8/1983 |
| JP | 35-6296 | 6/1960 |
| JP | 61-142076 | 6/1986 |
| WO | WO 98/45091 | 10/1998 |
| WO | WO 98/45092 | 10/1998 |

OTHER PUBLICATIONS

GranQuartz Stone Tools and Equipment 2000, vol. 1, Premium Segmented Diamond Blades for Granite and Sandstone, pp. 22–23, Jan. 2000.*

* cited by examiner

Primary Examiner—Robert A. Rose
(74) Attorney, Agent, or Firm—Finnegan, Henderson, Farabow, Garrett & Dunner, L.L.P.

(57) ABSTRACT

A method for making a sintered article comprising providing a plurality of individual blocks of sinterable matrix material, arranging said blocks in abutting relationship to form an assembly of said blocks in a sinter mold wherein said assembly comprises a plurality of said blocks extending in at least one direction thereof and sintering said assembly under pressure in the mold to form an integrated sintered article. The blocks may contain abrasive particles to provide a sintered abrasive article and individual abrasive segments may be extracted from the article.

67 Claims, 15 Drawing Sheets

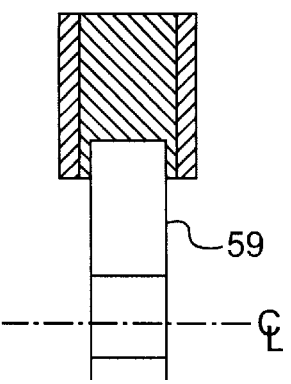
FIG. 14
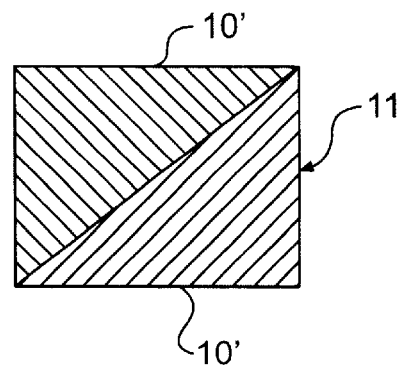
FIG. 15
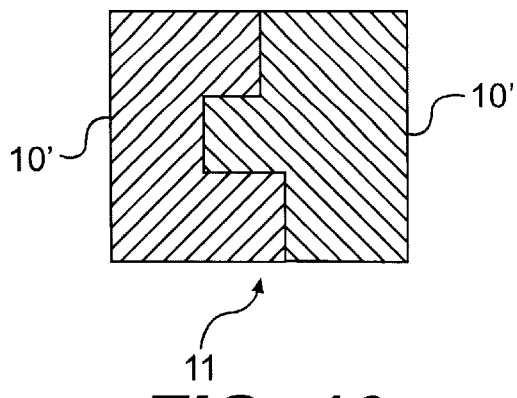
FIG. 16
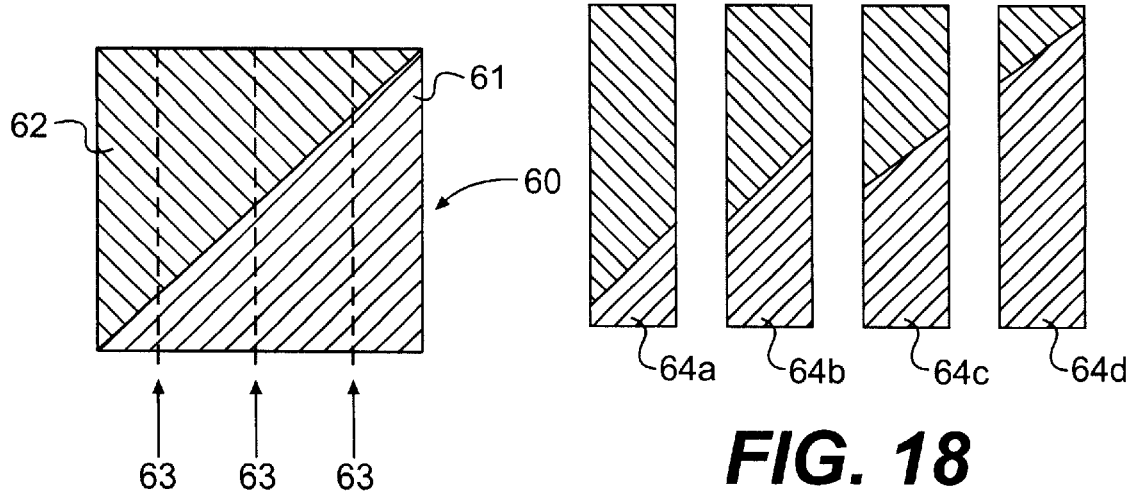
FIG. 17
FIG. 18

METHOD FOR MAKING A SINTERED ARTICLE AND PRODUCTS PRODUCED THEREBY

RELATED APPLICATIONS

This application is a continuation-in-part of U.S. application Ser. No. 09/055,217 filed Apr. 6, 1998, now U.S. Pat. No. 6,273,082 which is a divisional of application Serial No. 08/480,715 filed Jun. 7, 1995, now U.S. Pat. No. 5,791,330) and claims priority of provisional application Ser. No. 60/109,730 filed Nov. 23, 1998.

BACKGROUND OF THE INVENTION

This invention relates generally to powder metallurgy and more specifically to sintered powder parts and articles. Powder metallurgy includes, but is not limited to, compacting, casting, and sintering including sintering with and/or without a liquid phase, and/or infiltration, and/or under a load and/or pressure. Some examples of sintered powder parts and articles that can be made according to this invention include structural, porous, friction, anti-friction, cutting, corrosion-, wear- and heat-resistant parts, and inserts. In particular the present invention relates to sintered powder abrasive and super-abrasive parts and articles such as tools for cutting, drilling, de-burning, grinding, dressing, polishing, lapping, honning, and roughening and workpieces and wear resistant items.

Powders and powder pre-forms are widely used in the manufacturing of numerous sintered powder products including but not limited to wear-resistant, abrasive and super-abrasive parts and/or articles and/or tools. Powders for manufacturing abrasive products are conventionally manufactured by mixing hard and/or super-hard particles with sinterable and/or fusible retaining powders with or without a binder additive. Some powder preforms are conventionally manufactured by compacting the powders at room temperature (so called "green" compacts or segments) or casting and curing a mixture of the powder and a liquid and/or paste binder.

In the abrasive industry, sintered abrasive parts and articles comprise hard particles that in most cases are randomly distributed in a sintered powder retaining matrix. Specifically, cutting segments for segmented tools (blades, drill bits, etc.) are manufactured by mixing hard particles with powders of the retaining matrix, then compacting the powder at room temperature into a "green" segment, then sintering the "green" segment or a plurality of "green" segments into an individual sintered segment or a plurality of individual sintered segments respectively. Sintering may include infiltration of other components or compaction. Such infiltration and/or compacting also can take place before and/or after sintering and/or after a preliminary sintering.

Typically the sinterable segments or parts such as abrasive cutting segments are sintered as individual or separate bodies. In other words, each segment is separated from another one by compacting means (punches/plungers) and/or solid dividers and/or walls. These compacting means and dividers are strong bodies (i.e., graphite or metallic parts) that are not supposed to be crushed or substantially deformed in the process of compacting and/or sintering the "green" segments. In the case of radiant or induction and/or microwave sintering, pressure and heat and/or an appropriate atmosphere can be provided by appropriate means. In the case of electro-resistant and/or electro-discharge sintering, electrical current and/or pressure are provided by and or delivered through the compacting means.

This is illustrated in FIG. 1 where sinterable powder segments 1 are placed in a sinter mold 5 containing punches 2 and a solid divider 3 and having opposing pressure plates 6. FIG. 2 illustrates a more efficient arrangement where the punches 2 also serve as dividers between the segments. In either case a plurality of individual sintered parts are produced.

These solid compacting means and/or dividers occupy a substantial part of the volume of the sinter mold, generally 50% to 70%, resulting in a lower efficiency and utilization of the sinter mold volume, e.g., only 50% to 30%.

Moreover, assembling numerous "green" segments and punches together into a sinter mold is a time consuming process. Mechanization and automation of this process is a challenging task. Also while disassembling this type of sinter mold after sintering, one has to deal with separating the sintered parts from the punches and collecting and cleaning numerous small and thin punches and dividers to prepare them for use in the next sintering step.

Producing the sintered parts by filling a powder instead of "green" compacts or segments into the cavities of the sinter mold that also includes compacting means and/or dividers is also known, but it results in an even lower efficiency of sintering because the powders have 1.5 to 5 times lower densities than the "green" segments and it also creates problems because of the difficulty in achieving a uniform distribution of the powder in the cavities.

As taught in WO 94/20252, published Sep. 15, 1994, it is also known to make sintered abrasive cutting segments by providing a sheet of sintered abrasive material and then cutting out the sheet into a plurality of cutting segments with a laser or the like.

SUMMARY OF THE INVENTION

In accordance with the present invention, a new and improved method is provided for making unique sintered products in the form of a sintered article or plate as well as to individual sintered segments or bodies that can be extracted from the sintered article by suitable extracting means, such as laser cutting, water jet cutting, electro-erosion cutting, abrasive cutting, edge tool cutting, and mechanical distraction (breakage).

More specifically, a method is provided for making a sintered article comprising providing a plurality of individual blocks of sinterable matrix material, arranging said blocks in abutting relationship to form an assembly of said blocks, wherein said assembly comprises a plurality of said blocks extending in at least one direction thereof, and sintering said assembly to form an integrated sintered article.

The method according to the invention thus is characterized by sintering together, for example, a plurality of powder preforms or green powder compacts made of a sinterable powder to form a sintered powder article.

In the process, the blocks or preforms are integrated with neighboring blocks during sintering to form the sintered article. Diffusion of the components of the blocks can promote their integration. The individual sintered segments or bodies, extracted from the sintered powder article, can or cannot correspond to the original green powder blocks or preforms.

Sintering in a sinter mold, preferably under pressure, can be used to obtain the sintered article. Sintering under pressure (so called "hot compacting") is a particularly The assemblies can be of a variety of shapes including square, rectangular or round shapes and can optionally be provided with one or more through openings, such as a central opening.

In an advantageous embodiment of the invention a plurality of individual sintered powder segments or bodies are extracted from the sintered powder article. These individual sintered powder bodies can be used as articles or as parts of a larger article. They also can be of various one, two, or three dimensional shapes including, but not limited to, polygon, rectangular, square, round, cube, elliptical, cylindrical, pyramid, core, frustum cone, arc, nail, needle, pen, spiral and can have at least one indent and/or through opening.

If necessary, these extracted bodies can be readily joined or fixed to a carrier and/or to each other by gluing, welding, braising or by mechanical means such as locking or riveting, or by any combination thereof.

The blocks of sinterable matrix material can be made out of the same or different compositions. Therefore, depending on shape, size of the blocks, layout of the assembled blocks or the assembly and conditions of sintering, the resulting integrated sintered powder article can comprise a variety of compositions distributed through the article in a predetermined, including but not limited to non-random, and desired manner. This enables the integrated sintered articles to be provided with unique characteristics of man-made material.

Furthermore, the assembly can comprise multiple layers, each layer comprising a plurality of the blocks so that individual bodies extracted from the same sintered assembly but from different parts thereof can have the same and/or different compositions and characteristics, and therefore different performance characteristics derived from the composition of the blocks, make-up of the assembly, presence of additional materials in the assembly, conditions of sintering and the pattern of extraction of the individual sintered bodies from the sintered article.

Depending upon the use of the final product, the sintered article and/or extracted individual bodies or members can be treated in a variety of ways including, but not limited to, thermal and/or pressure treatment (i.e., re-sintering in a vacuum or protective atmosphere, infiltration, impregnation, quenching, tempering, annealing, drawing, forging), mechanical and abrasive machining and plating (for example with a composition comprising hard particles such as diamonds) by, i.e., electrolytic and/or plasma methods.

Examples of applications for such products include, but are not limited to, laminated, layered or sandwiched composites and parts for construction, wear- and corrosion-resistant articles, breaks, heat absorbers, abrasive tools, edge tools, electrodes, electrical switches, insulators, porous filters, machine parts, etc.

Various manufacturing operations can be used to assemble the sinter mold load and the parts of the sinter mold or frame. This sinter mold load includes, but is not limited to blocks, at least partially assembled blocks and compacting means, such as punches, separators, insulators, side walls, etc. These manufacturing operations can also include, if needed, means for aligning, trimming, temporarily and permanent holding and assembling, moving, transporting and fastening the parts of the mold as well as the sinter mold load.

These operations may include labor (human hands), semi-automatic or automatic mechanisms, and robots that can form an assembly line. Adhesives, glues, fasteners, negative relative pressure (e.g., suction heads, vacuum), pressure, weight load, gravity, magnets (electrical, permanent, etc.), air/gas, heat, freezing, chilling, loading, pushing, pulling, friction and antifriction means, inserting, sliding, and any combination of these means with each other or with other means can be used. In the case of using pre-sintered or fully sintered powder preforms, they can be formed into an assembly of blocks by the use of soldering, brazing, infiltration, and welding.

The assembling of the blocks can take place completely within, at least partially within, or outside of the sinter mold or frame.

Therefore, any means for assembling and disassembling, transporting, moving, handling (i.e., lifting, sliding, turning, lowering, placing), inserting, aligning and trimming of a sinter mold load i.e., the components, which may include the blocks of sinterable material, at least partially assembled blocks, punches, separators, sintered articles and parts of the sinter mold/frame are within the scope of this invention.

It is also possible to introduce additional materials into the assembled block either in the process of or after the assembly thereof. These additional materials can be put between at least some of the blocks and/or layers of the blocks. These additional materials can provide reinforcement of the assembled blocks and/or sintered article and/or provide diffusion or diffusion enhancement components. Examples of additional materials include shims, foils, metallic and non-metallic materials, mesh type materials, sinterable materials, fusible and brazeable materials, materials exhibiting adhesive performance, liquid, paste, powder, cast powder, compacted (i.e., roll compacted) powder, semi-sintered, sintered powdered products and welded and brazed parts.

For a purpose of making abrasive and/or edge tools and wear-resistant parts, at least one of the blocks and/or the assembly of blocks can contain at least one type of a plurality of abrasive particles, and the resulting integrated sintered article can be used as an abrasive article or one or a plurality of individual sintered abrasive segments or abrasive cutting elements can be extracted from it by suitable extracting means, such as laser cutting, water jet cutting, electro-erosion cutting, abrasive cutting, edge tool cutting, and mechanical distraction. These elements or segments can be of various shapes, including but not limited to, polygon, rectangular, square, round, elliptical disc, cylindrical, frustum cone, cube, pyramid, donut, sector, arc, pin, or spiral and can have at least one indent and/or through opening.

These articles can be used as grinding wheels, rotary dressers or the elements as the cutting and grinding segments of abrasive machining or cutting tools. Examples of individual extracted sintered abrasive segments for a tool include cutting members for cutting and/or edge tool, such as segments or tips for circular, chain, reciprocating and wire type cutting blades. Further examples of such tools include cutting, grinding, polishing, lapping, dressing, milling, roughening, chamfering, de-burning, gripping and friction tools. More specifically, the members can be used to form abrasive segmented cutting blades, abrasive segmented drill bits, continuous abrasive surfaces, or rims, segmented continuous abrasive surfaces or rims but with the segments tightly fixed, adjusted and/or joined to each other, e.g., by welding or braising to imitate a continuous and tools having combinations of such motions. Examples are face-grinding tools, cylindrical tools and other rotary tools, wheels, pencil wheels and conical tools.

Examples of materials that can be machined with these tools include sintered materials, ceramics, glass, wafer, semiconductor, metallic, non-metallic, fiber, graphite, carbon materials, hard metals, asphalt, natural or artificial stones, concrete, rocks, abrasive and super-abrasives, and floors made out of natural stone, artificial stone or concrete.

Preferably the extracted sintered abrasive elements or segments (i.e., the cutting and grinding cutting members) are shaped to be fixed to a tool carrier such as the core of a circular abrasive cutting blade or wheel. Prior to mounting on the carrier, the extracted sintered abrasive elements can be, if required, machined, re-cut, de-burred, trimmed and dressed as required.

Further, the plurality of abrasive particles may be randomly and/or non-randomly distributed in the sinterable matrix material of the blocks and/or in the assembly of the blocks, and therefore in the resulting sintered article, and at least in some of the acted elements. Non-random distribution can be provided by means of mesh type materials and/or tacky materials and/or by any other means such as but not limited to hard placement, CNC machines and any other placement and distribution devices including temporarily holding devices.

In addition, while some of the blocks can contain abrasive particles, others can contain no abrasive particles or a surface containing no abrasive particles to provide non-hard particle zones. In this way, bodies extracted from the sintered articles have at least one non-abrasive or hard particle zone enabling them to be more readily fixed to an abrasive tool carrier.

As disclosed above, these extracted bodies can be readily joined to a carrier such as an abrasive tool carrier, by means of gluing, welding, braising or mechanical means, i.e., locking or riveting, or by any combination of at least some of these methods.

The ability to obtain sintered extracted parts suitable for welding, (specifically, for laser, electron-beam and tig welding) and brazing (specifically, for induction and furnace braising) to a carrier is a particular advantage of this invention.

Considering, by a way of example, diamond-containing abrasive segments having a non-hard particle zone and/or surface can be readily integrated with a tool carrier because the absence of hard particles in the welding or braising zone makes this joining process more feasible and enhances the strength of the joint. These zone(s) (so called "feet") and/or surface(s) can also comprise material that is different from the matrix material used to retain the abrasive particles in the individual extracted body, that is more compatible for the purpose of joining, i.e., welding or braising, the material to the tool carrier. Further, the non-hard particle zone can comprise a few occasional hard particles or comprise hard particles of a concentration that is lower than the concentration of hard particles in other zones and/or on the surface of the extracted bodies as long as this concentration is low enough not to detrimentally effect the strength of the braise and/or weld seam.

Therefore this invention relates to a unique method for making integrated sintered articles that have a desirable and pre-determined distribution of components (e.g., hard particles), layers and compositions for optimization and high performance of the final products made from the articles as well as to individual elements or bodies extracted from the articles. This process is an efficient and economical way of manufacturing the articles which utilizes machinery and equipment that are readily available and widely used in the industry.

BRIEF DESCRIPTION OF THE DRAWINGS

These and other features and advantages of the present invention will become apparent from consideration of the following specification when taken in conjunction with the accompanying drawings in which:

FIG. 14 shows an alternative way to use segments cut from the sintered article of FIG. 13;

FIGS. 15, 16, and 17 show various assemblies of blocks;

FIG. 18 shows segments cut from the sintered assembly of FIG. 17;

FIGS. 33a–e show a further form of a sintered article and segment cut from the article;

DETAILED DESCRIPTION OF THE INVENTION

Unless specified otherwise, the following terminologies have the following meanings.

Sinterable material includes but is not limited to fusible and brazeable materials.

Powder preforms, or block of sinterable matrix material means block of loose, sinterable material consolidated by any means including but not limited to compacting and casting, use of dispersible and/or depositable materials, such as materials deposited by vapor or thermal-spray or by electrical and chemical deposition, or by dispersing or depositing the materials on a substrate, such as a metallic shim.

"Green" powder compact is a type of preform in which the sinterable material has been compacted to form a body and may include abrasive particles and/or mesh type materials.

Cast powder is another type of preform in the form of a powder tape or a soft easy deformable flexible preform.

Assembly is the assembled blocks.

Sintered assembled block is the blocks assembled together and then sintered to form an integrated sintered powder article.

Sintering includes sintering in a solid state, in the presence of a liquid phase and in a liquid phase.

Extracted body or segment is a body cut out of the sintered powder article.

Figure 1:
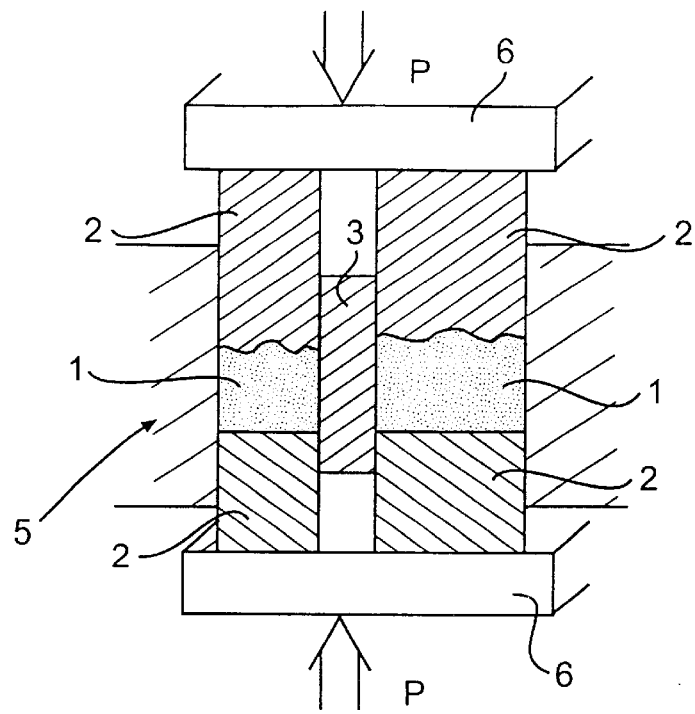
FIG. 1 illustrates schematically a conventional process for making sintered segments or bodies.
Figure 2:
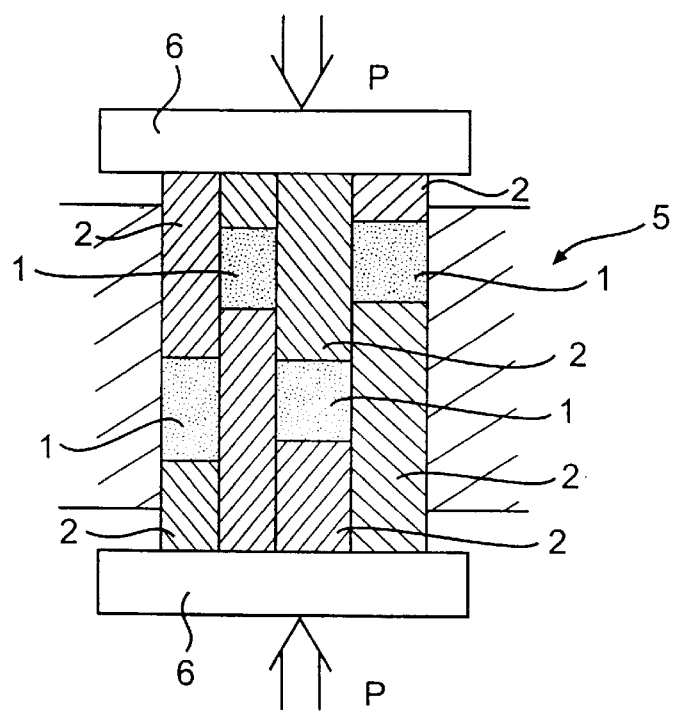
FIG. 2 illustrates another conventional process for making such bodies.
Figure 3:
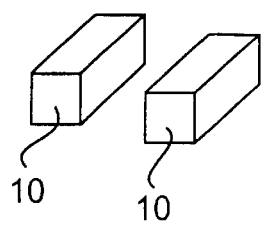
FIG. 3 shows a pair of blocks of sinterable matrix material suitable for use in the present invention.
Figure 4:
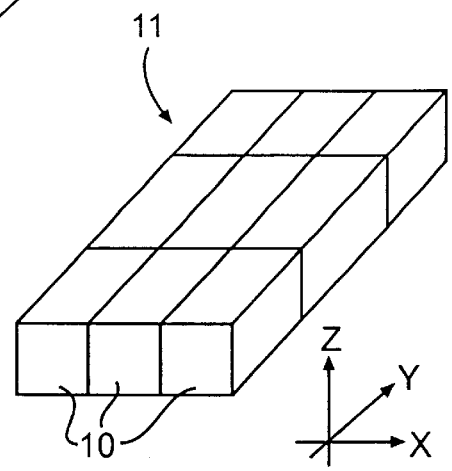
FIG. 4 shows an assembly of the blocks of FIG. 3.

In accordance with the invention, and with reference to FIG. 3, there is shown individual powder preforms or blocks of sinterable matrix material 10. In accordance with one embodiment of this invention, a plurality of these blocks are arranged together in abutting relationship, to form an assembly 11 such as shown in FIG. 4. The geometry of the individual blocks should be such that they substantially match the geometry of neighboring blocks and the plurality should extend in at least one direction. Other examples of a plurality of blocks 10' forming an assembly 11' are shown in FIGS. 15 and 16. Preferably, as shown in FIG. 4, the assembly has an X, Y and Z axis at right angles to one another and the plurality of the blocks extend along at least two of these axes; in FIG. 4, along the X and Y axis.

Figure 5:
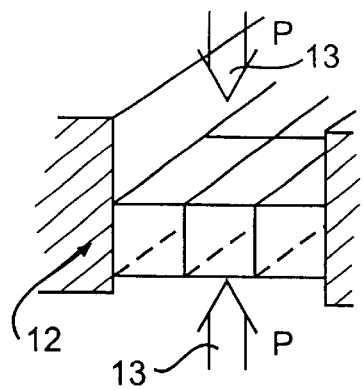
FIG. 5 illustrates schematically the sintering of the assembly of FIG. 4 in a sinter mold.
Figure 6:
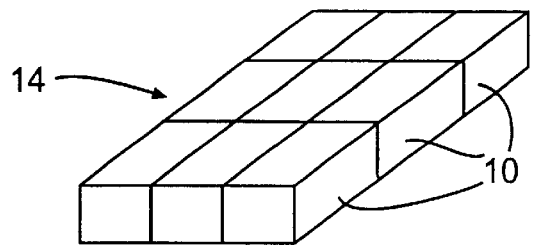
FIG. 6 shows an integrated sintered article or plate produced from the assembly of blocks according to the method of the present invention.

The assembly is then sintered in a sinter mold 12 with or without infiltration material, preferably under pressure applied by opposing punches 13 as shown schematically in FIG. 5 to form an integrated sintered powder article 14 as shown in FIG. 6 in which the individual blocks 10 are integrated together to form a unitary structure.

By infiltration material, is meant material from any source such as from some of the blocks, materials placed between at least some of the blocks, or materials applied to at least one outward side of the assembly of the blocks before or during sintering.

Figure 7:
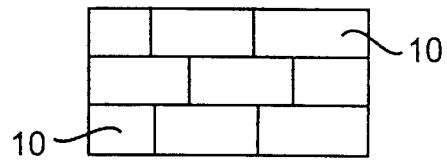
FIG. 7 shows an alternative assembly of the blocks.

While FIG. 4 shows the plurality of assembled blocks extending in the X and Y direction, the plurality of blocks 10 can also extend in the Z direction as shown in FIG. 7. Further, the joints between the blocks can be staggered in any of the three directions as also shown in FIG. 7.

Figure 8:
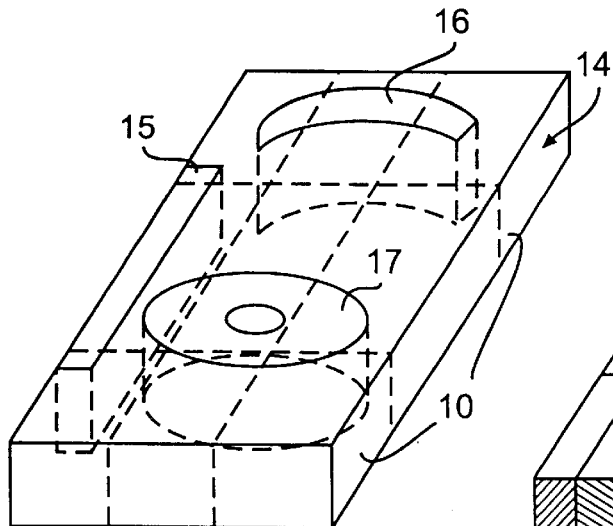
FIG. 8 shows the shapes of segments that can be cut out of a sintered article.
Figure 9:
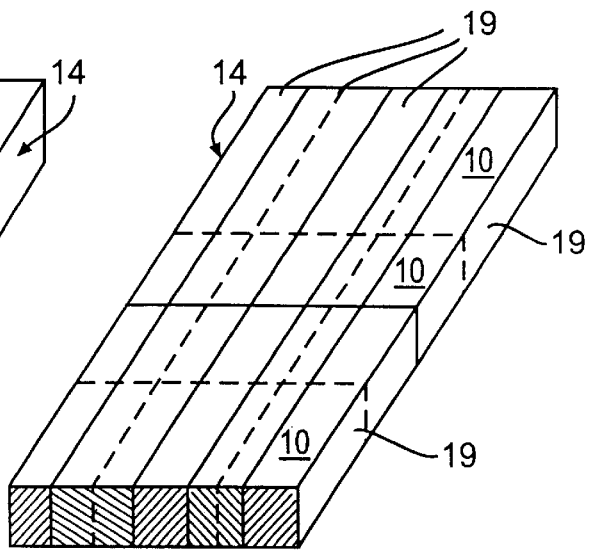
FIG. 9 shows an alternative pattern for cutting out segments from a sintered article.

Following sintering, the sintered powder article 14 can then be machined and used as is or cut up to form individual sintered powder bodies 15-19 as illustrated, for example, in FIGS. 8 and 9. The bodies 15–19 can be extracted from the article 14 by laser or water jet cutting performed under any desired angle and/or direction. As shown the bodies can be derived from more than one individual preform or block 10. Thus by controlling the content of each block 10 it is possible to obtain a sintered body or segment having a prearranged makeup.

Furthermore, due to different compositions of the blocks, their layout in the assembly and the extraction or cutting pattern, the individual extracted sintered bodies extracted from different parts of the sintered article may comprise different compositions and therefore have different characteristics resulting in different performance. FIGS. 17 and 18 illustrate in general how a sintered article 60 made from an assembly of a block 61 of one composition and a block 62 of another, and then cut according to lines 63 can form individual extracted segments 64a-d of different compositions.

Also, a block can comprise a nonuniformity by a default in a manufacturing process or otherwise providing a nonuniform and/or alternating compositions and/or layers.

For example, part of the body can contain a certain concentration of abrasive particles and another a different or none. Also in one part of the body the abrasive particles may have a nonrandom distribution and in another a random distribution.

Accordingly, by this method it is possible to easily and accurately obtain individual sintered powder bodies or segments having an infinite variety of shapes and compositions.

Figure 10:
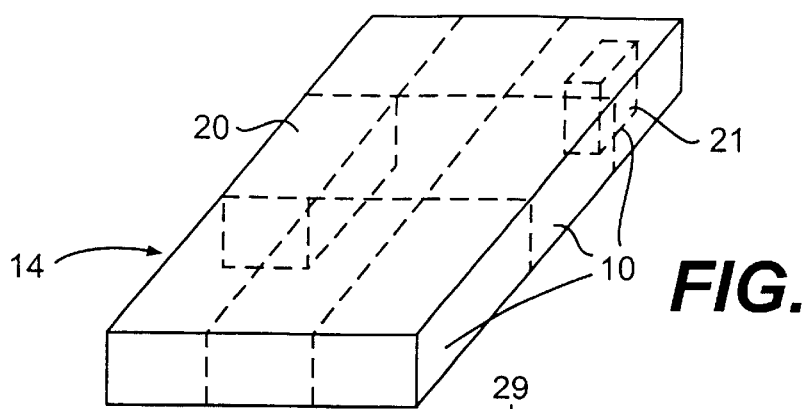
FIG. 10 shows yet a further pattern from cutting the article.

As shown in FIG. 10, it is also possible to extract bodies 20 from the sintered powder article 14 that correspond to the original, but now sintered individual blocks 10 or bodies 21 that are wholly contained within an original block.

In a preferred form of the invention, the process is used to make a single, sintered article containing abrasive material which is then cut out into a plurality of abrasive bodies or members; preferably cutting members in a shape that allows them to be fixed to the carrier or core of a cutting tool.

In this method a plurality of blocks of sinterable matrix material containing at least one plurality of abrasive particles, distributed randomly therein or preferably distributed therein in at least one nonrandom manner by means of a mesh material as taught in, for example, but not limited to, U.S. Pat. Nos. 4,925,457 and 5,092,910 is used. The blocks are then assembled together, for example, in a lateral manner relative to each other as shown in FIG. 4 or over each other as shown in FIG. 7 to form an assembly in which a plurality of the blocks extend in at least two directions.

The assembly is then sintered, preferably under pressure in a sinter mold, with or without infiltration, in such a way that the sinterable material of the blocks diffuse into each other during sintering and form a single solid sintered powder article or workblank which can then be cut into the desired abrasive tool blanks or segments or cutting and grinding members by, for example, laser or water jet cutting as shown in FIGS. 8 and 9.

Examples of abrasive segments or cutting members are bits, reamers, strips, discs, wheels, plates, segmented and composite cut-off discs and/or saw blades, dressing, grinding, polishing, lapping, honning, and roughening tools, wheels and discs, all for a use with hand and/or power tools. These abrasive articles can be utilized with rotary and/or reciprocating and/or stationary tools. Examples of such tools are face grinding tools (i.e., floor grinding tools, face grinding disc and pads), grinding wheels (i.e., pencil wheels, router bits) and drums, cutting tools (i.e., rotary blades, wire/cable blades, gang blades), drills and chamfering and de-burning tools.

Several advantages of the present invention include use of conventional "green" compacts or powder preforms that presently are produced in large quantities by many companies;

utilization of existing assembling tools and mechanisms, cold compacting tools and presses, sinter molds and sinter presses;

significant increase of manufacturing productivity of abrasive segments by extracting them from an integrated sintered workblank rather than compacting and sintering individual segments;

utilization of the same sintered and integrated workblank to provide extracted blanks and segments of a variety of shapes and sizes;

no need to provide special (and expensive) tools to compact and/or sinter segments of sophisticated shapes; e.g., all tools can be made to provide only rectangular pre-forms (i.e., "green" segments) and/or integrated sintered workblanks.

Figure 19A:
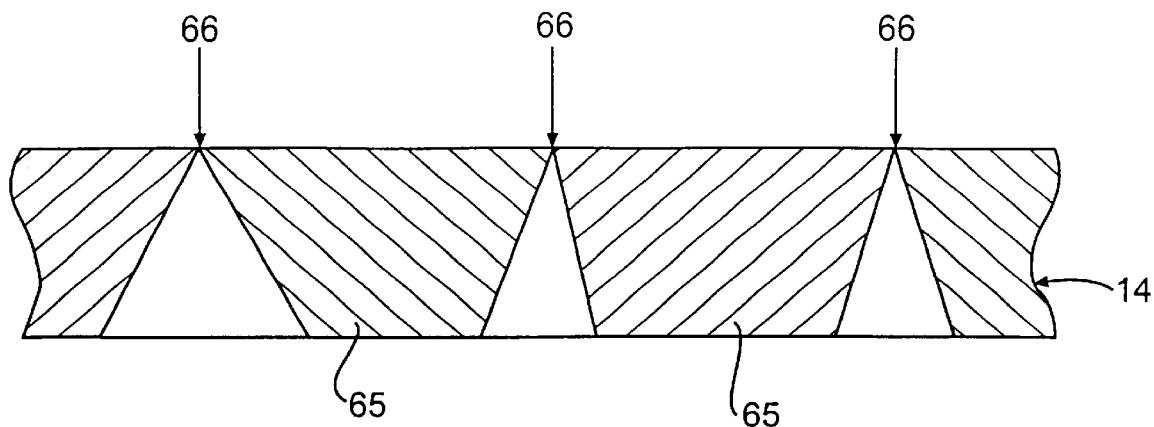
FIGS. 19a–b show segments cut from an assembly by water jets and a segment mounted on the core of a tool.
Figure 19B:
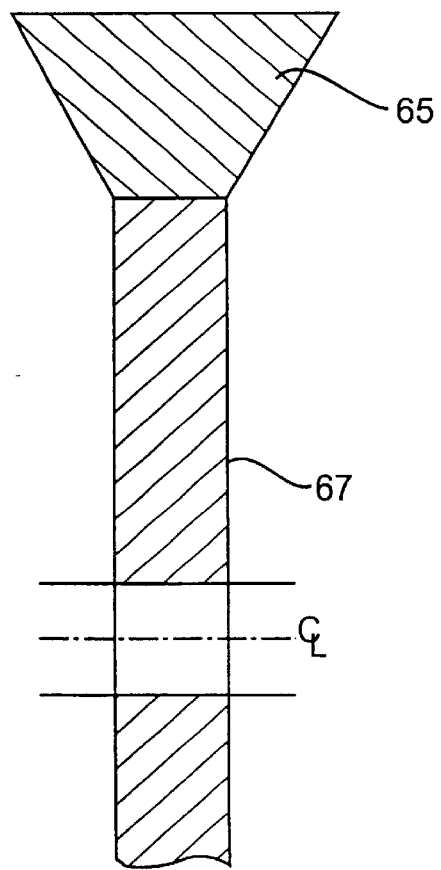

There are also advantages arising from extracting individual sintered segments from a sintered workblank such as a rectangular plate instead of sintering individual segments. When a water jet is used for extracting sintered segments out of this sintered plate, it provides openings of hard particles due to erosion of the sintered bond around the hard particles. Therefore abrasive dressing of the proper sides of the segments when mounted on the tool may not be required. Also cutting through the thickness of the sintered workblank with a water jet or laser allows the cut surface of the segment to be conical due to the natural spreading and/or purposely de-focusing of the cutting beam. Therefore a conical shaped segment (desired and conventionally produced by utilization of special so called "conical" punches and/or abrasive dressing) can be obtained automatically because of the nature of the extraction process. This is illustrated in FIG. 19a which shows conical shaped segments 65 cut out of an article 14 by laser or water jet beams 66 and FIG. 19b shows a segment 65 mounted on the core 67 of a segmented cutting blade. Cylindrical and frusted conical segments or bids for wire-blade or wire-saw can be produced the same way.

Figure 11:
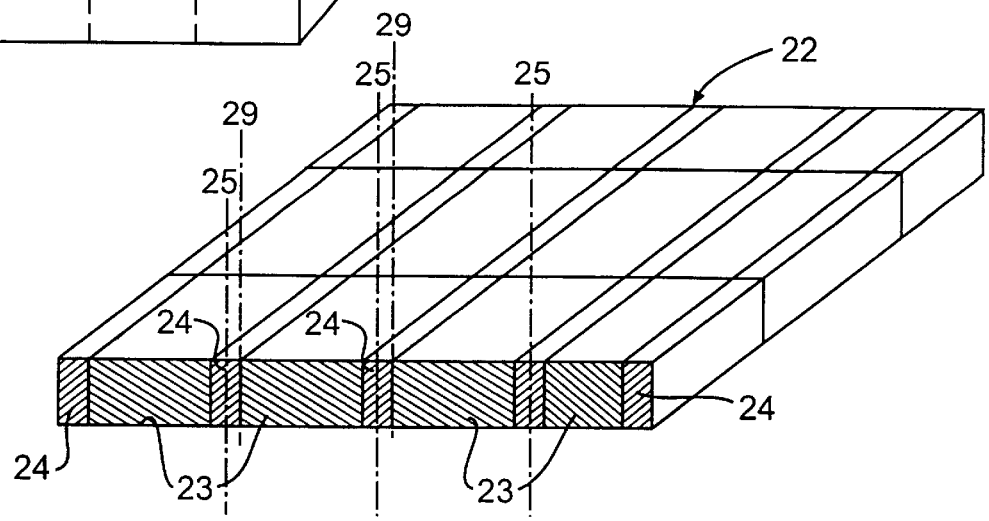
FIGS. 11 and 11a–c illustrate a sintered article made from blocks of more than one composition, patterns for cutting it, and use of the segments cut from the article.

FIG. 11 shows an assembly 22 comprising blocks 23 of sinterable matrix material containing abrasive particles interspersed with blocks 24 of sinterable matrix material containing no abrasive particles.

Figure 11A:
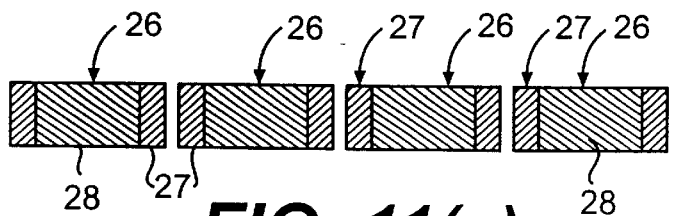

After sintering to form a single, sintered material article or workblank, it can be cut along lines 25 to provide a plurality of cutting members 26, as shown in FIG. 11a, having an outer edge portion 27 on either side devoid of abrasive particles and a core portion 28 of sintered matrix material containing abrasive particles.

Figure 11B:
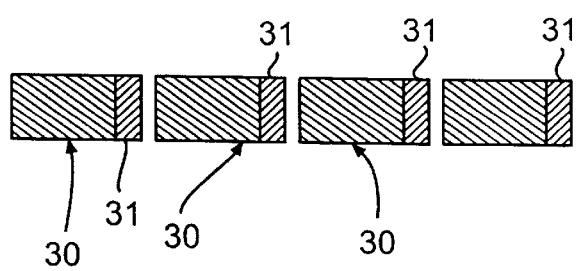
Figure 11C:
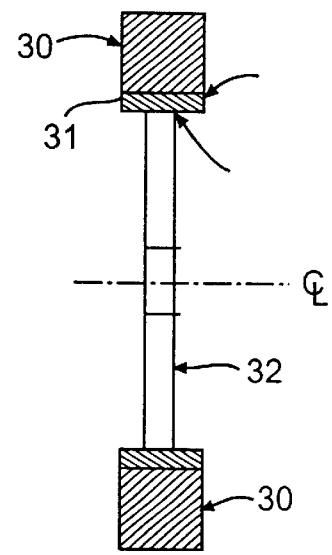

Alternatively, the workblank can be cut along the lines 29 to provide the plurality of cutting members 30 as shown in FIG. 11b with the portion 31 devoid of abrasive particles being only on one side. Typically, as shown in FIG. 11c these types of cutting members 30 can be mounted on the core 32 of a cutting tool with the portion 31 or foot of the cutting members being the portion welded or otherwise secured to the core.

The composition of portion 31 can be different from the composition of portion 30 by the content (concentration) or absence of the hard particles, but also by the composition of the powder. For example, portion 30 can be a Co—Cu—Sn sintered alloy retaining diamonds as the hard particles, while portion 31 is a Co—Ni sintered alloy with no diamonds in it. It is understood from a general knowledge in the welding (specifically, laser welding) technology that portion 31 that does not comprise Cu can be successfully welded to a steel core 32, while portion 30, that comprises Cu, would present a substantial technological problem of welding it directly to a steel core 32. Also the presence of diamonds in portion 30 would complicate direct welding portion 30 to steel core 32, while the absence of diamonds avoids this problem. Thus by providing a foot on the cutting members that does not interfere with welding (e.g., laser welding) due to the absence of abrasive particles in the foot area exposed to the laser beam, the blocks are "welding friendly."

Another advantage of providing a portion 31 comprising, ideally, no abrasive particles at all, but realistically probably a few compared with portion 30, is the ability to machine this portion to match it's mounting radius to the radius of core 32. Practically it means that a stock of segments, that are all cut out of a sintered article as bodies with a flat or curved foot 30 can be ground to match the radius of an existing core 32 instead of having to make a new set of segments with the proper radius.

Figure 12:
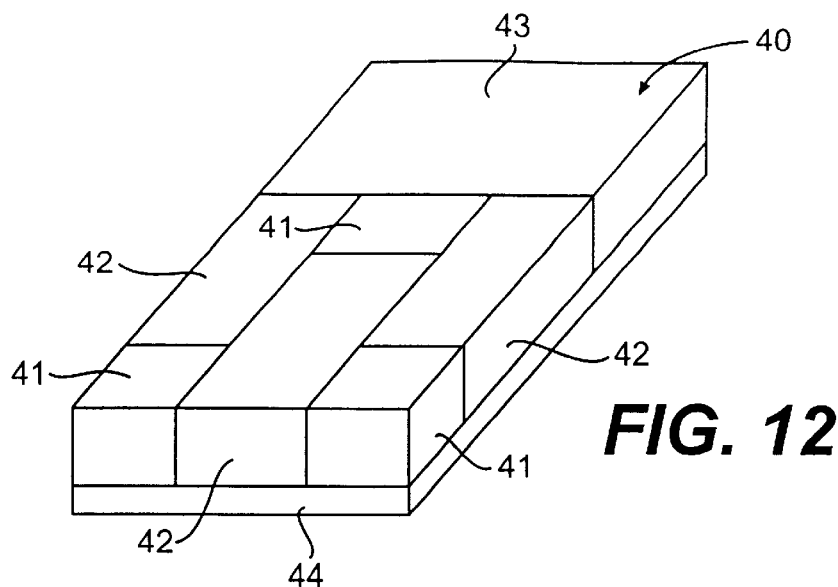
FIG. 12 illustrates a sintered article made from blocks of various shapes and additional materials.

FIG. 12 is an example of a sintered, abrasive material article or workblank 40 made of blocks 41,42 of various sizes and/or shapes. Individual sintered segments or cutting members can then be extracted from the workblank in the same manner as described above to provide an infinite variety of cutting members of various shapes and compositions depending upon the makeup of the various blocks.

If required, at least one sheet of a further material 44 may be placed below and/or above and/or within the assembly of blocks before sintering which will form a part of the final workblank and any segments cut out of the workblank.

Figure 20:
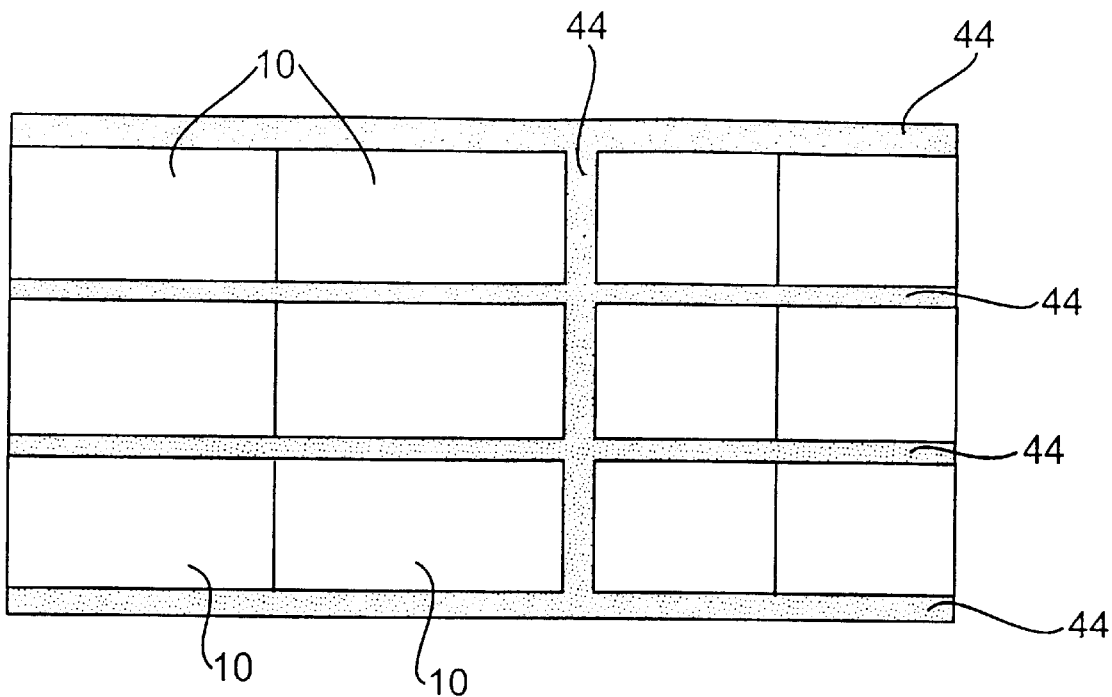
FIG. 20 shows an assembly of blocks with additional material.

This material 44 can be placed in any order or pattern as shown in FIG. 20 (constant and/or alternating) and extend in any direction. For example, metallic materials (i.e., comprising steel, Cu, Ni, Bronze, Brass) can be used as material 44. Also, material 44 can be used as reinforcing members of the assembly and therefore of the sintered article and extracted sintered bodies. Metallic material 44 can be utilized for attaching the article or bodies to a tool carrier by welding, brazing, mechanical fastening and gluing. Material 44 also can be utilized for providing and/or enhancing diffusion between blocks in the process of being sintered. Material 44 can produce a liquid phase during sintering. Material 44 can be utilized as an infiltrating material and for filling residual porosity in the sintered article.

Figure 21:
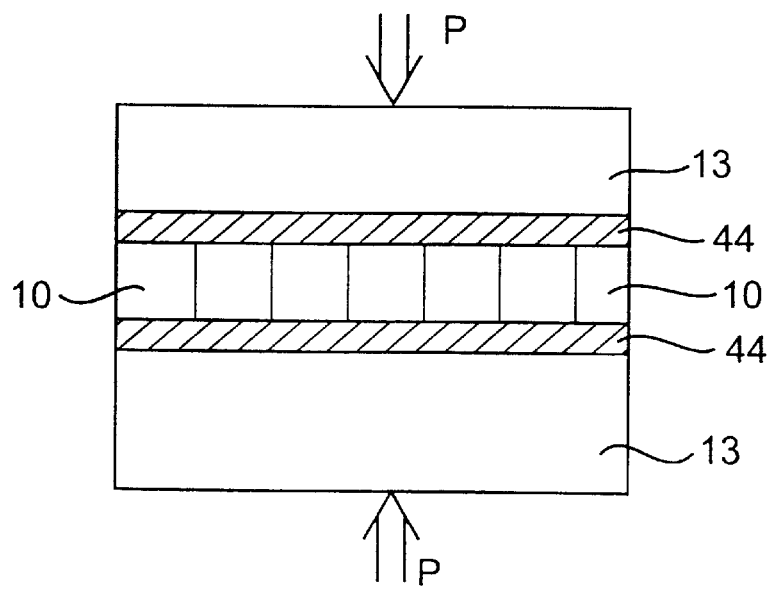
FIG. 21 illstrates a preferred assembly of blocks with additional material.

Further, such material can comprise a piece of cast powder and/or free powder and/or powder slurry and/or mesh material that covers at least one powder preform or block and that is different from the powder of the block. FIG. 21 illustrates a preferred embodiment where an assembly of a plurality of blocks 10 between punches 13 of a sinter mold has a layer of cast powder 44 on either side of the assembly.

In general, the means for extracting or cutting the bodies from the workblank include any type of machining operation (e.g., cutting, milling, grinding, drilling) or their combinations performed by means chosen from but not limited to abrasives (i.e., abrasive cutting or grinding or dressing), edge tool (i.e., edge tool cutting, milling, drilling) and mechanical destruction (i.e., breakage, static, dynamic, electro-dynamic and explosive breaking), but preferably by laser (i.e., laser cutting), plasma (i.e., plasma cutting or drilling), water jet (i.e., water jet cutting or dressing)

electro-erosion (i.e., electro-erosion grinding or cutting) and by any combination of these means and methods.

Figure 13:
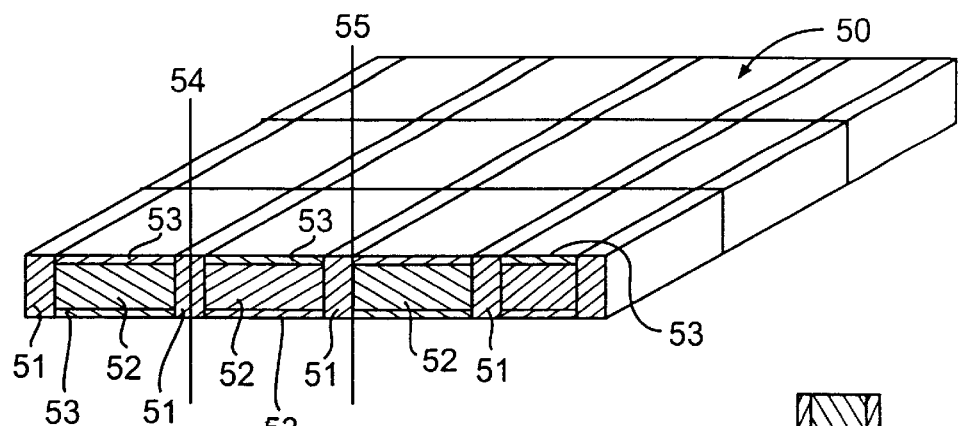
FIGS. 13 and 13a–c views similar to FIGS. 11 and 11a–c.
Figure 13A:
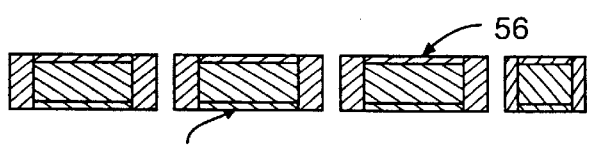
Figure 13B:
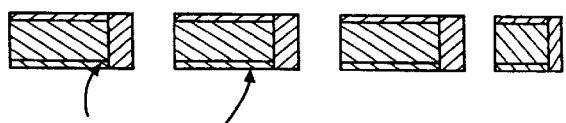
Figure 13C:
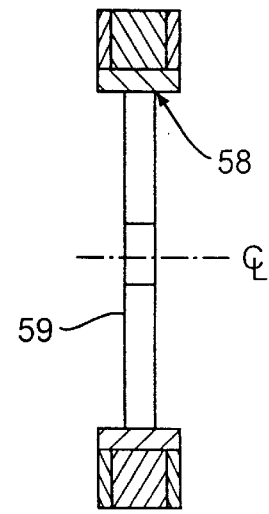

FIG. 13 is a view similar to FIG. 11, but showing an assembly 50 of blocks in which blocks 51 of a different composition are not only on either side of abrasive containing blocks 52, but also blocks 53 above and below them. When the assembly is cut along the lines 54, cutting members 56 shown in FIG. 13*a* are formed and when cut along the lines 55, cutting members 57 shown in FIG. 13*b* are formed. FIG. 13*c* shows cutting members 58 similar to members 57 welded or otherwise affixed to a cutting tool core 59.

FIG. 14 shows an alternative way to use and mount segments cut from the sintered article of FIG. 13 on a cutting tool core 59.

In practice more than one assembled block (single or multi-layered) are simultaneously sintered in a sinter mold under pressure and/or in a furnace. In case of sintering under pressure, the assembled blocks are positioned within the sinter mold in a stock manner (in such manner that the layers rise) in the direction of application of pressure and/or load. In a "vertical" sinter press, where the pressure is provided in a vertical direction, it will be in the Z-direction. In the case of a "horizontal" sinter press, where the pressure is provided in a horizontal direction, it will be in the X- or Y-direction.

Figure 22:
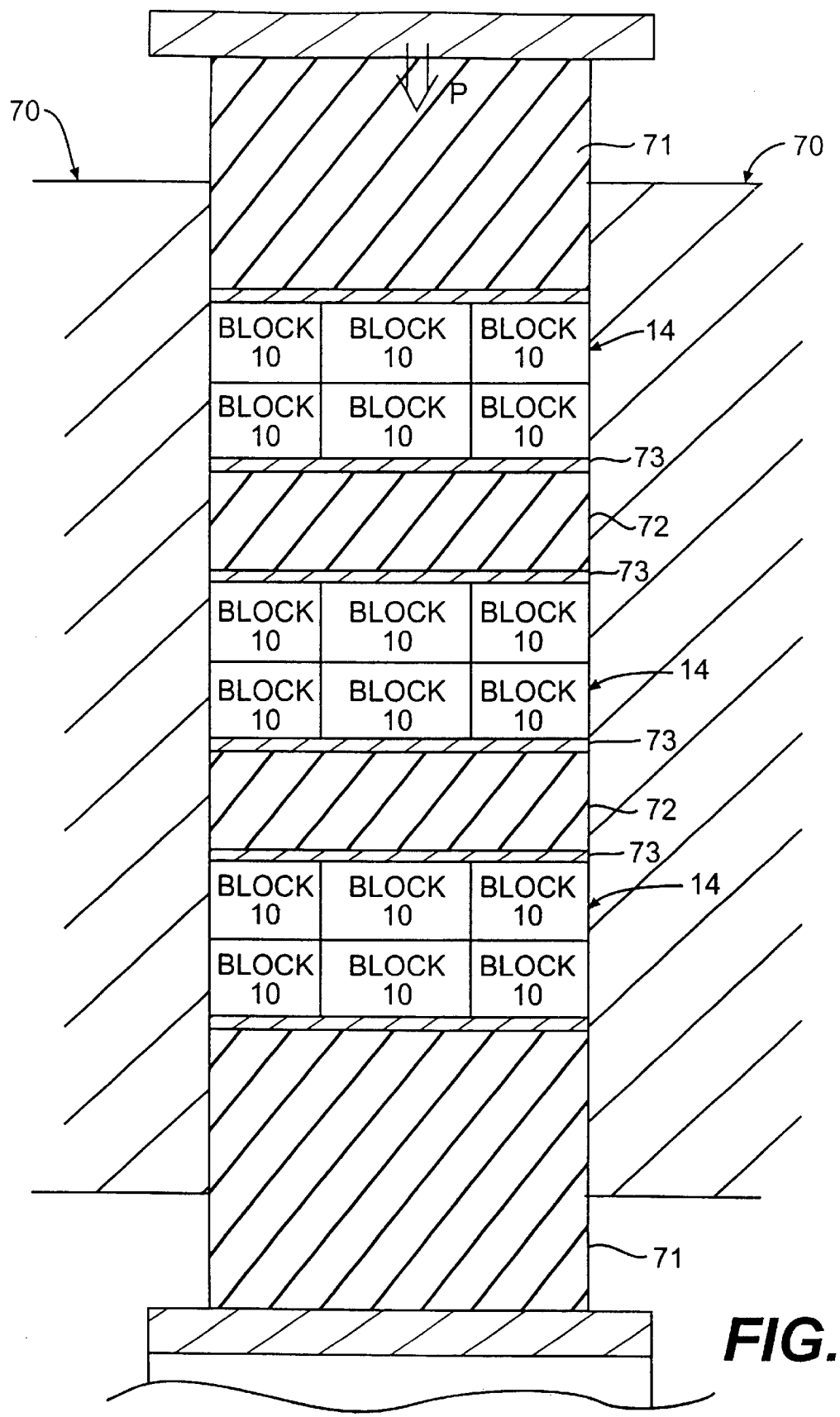
FIG. 22 shows a sinter mold containing a plurality of assemblies.

FIG. 22 illustrates a sinter mold 70 similar to that shown in FIG. 5 positioned in a sinter chamber (not shown) of a "vertical" press (not shown). Several assemblies 14 of blocks 10 are stacked in the sinter mold in the Z-direction corresponding to the direction of application of the compacting force P by punches 71. Preferably, the assembled blocks are separated from each other in the Z-direction by internal punches 72 and/or dividers or separators 73. The punches 72 are preferably solid graphite or carbon or metallic alloy (i.e., cobalt and/or nickel based alloys) plates. The dividers/separators 73 are preferably sheet type materials preventing sticking or welding during sintering of the assembled blocks with the punches 72. The dividers/separators 73 preferably comprise, but are not limited to, one or more layers of materials disclosed in U.S. Pat. No. 5,203,880, such as "graphite paper" (i.e., Flexitallic made by Union Carbide), copier paper, thermal- and/or electrical-insulating sheets. Use of separators are important in case the matrix materials of the blocks or additional materials in the sinter mold comprise carbide forming materials or elements such as, but not limited to, chromium, titanium, tungsten, silicon, or boron.

The punches providing compaction within the sinter mold during sintering can be assembled punches. These assembled punches can comprise pieces of materials that geometrically match each other to form, when properly assembled, the assembled punch. The materials can be the same across the assembled punch, but can also be different and/or comprise different materials (i.e., some individual punches can be coated with boron nitride) based on the above described concept of redistributing natural flux of electrical current and heat distribution.

For example, a solid graphite punch of 100 mm×100 mm×10 mm thickness can be replaced by eight assembled punches of 25 mm×25 mm×10 thickness. An advantage of this is the use of conventional punches for sintering large sintered articles and minimization of the risk of breaking a large single punch in the process of compacting and/or sintering.

The assembled punches can join each other as a result of sintering and/or an additional treatment. For example, graphite punches can be coated on matching facets with iron powder. As a result, iron carbide is formed in the process of sintering which joints the individual punches together firmly so that they act substantially as a solid punch.

The assembled punch can leave marks or indentations onto the sintered article along the lines of joints which can be removed if necessary.

Figure 23A:
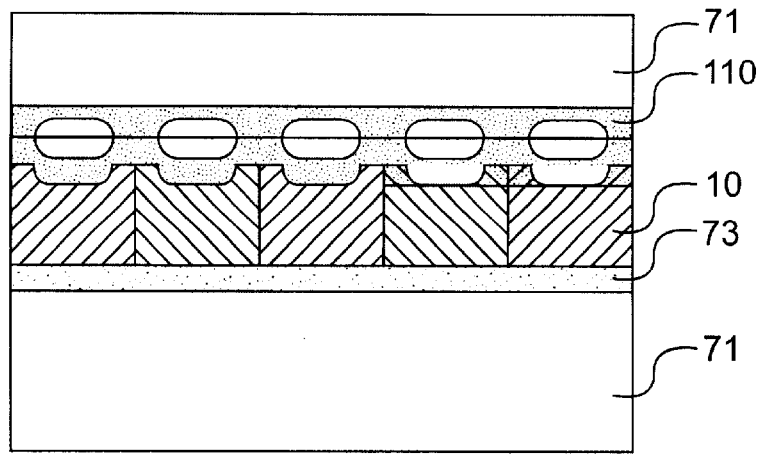
FIGS. 23A and B show methods for making a sintered article having an indented surface.

As shown in FIGS. 23A and B, if it is desired to make a sintered workblank 105 with at least one corrugated, indented surface 107, but without having to provide punches 13 with a corrugated surface or of different dimensions in the direction of compacting, the dividers/separators 73 may be a mesh-type material 110 (i.e., an expanded foil manufactured by Delker Corporation, i.e, from iron, steel or nickel sheets). This method is basically described in, but not limited to, U.S. Pat. No. 5,620,489, wherein this method was developed only for making abrasive articles comprising corrugated surfaces by sintering soft and easy deformed flexible powder preforms such as cast powder. In the present invention, indentation can be applied also to the "green" compacts and/or at least partially sintered and/or even fully sintered preforms (which all are denser and harder than cast powder preforms) with or without presence of cast powder in the assembly. A sintered indented surface 107 results in providing abrasive tools with higher pressure per hard particles, favorable conditions of removal of slurry of the machined workpiece, that separately and in a combination results in the more efficient tool, and also provides a distinctive appearance to the abrasive tool.

Figure 24:
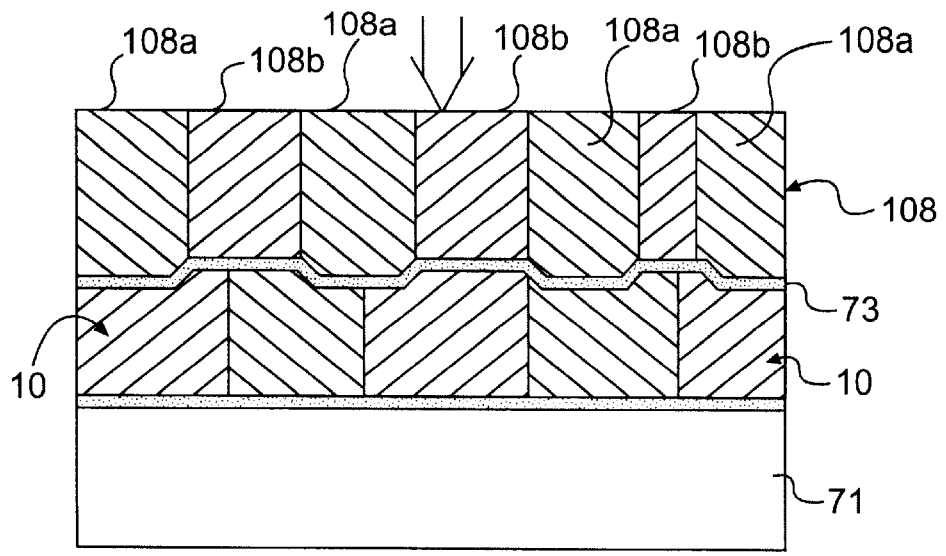
FIG. 24 shows a further method for making an indented sintered article.

Of course, as shown in FIG. 24, a corrugated punch 108 or at least two pluralities of punches 108A and 108B (as shown in FIG. 24) assembled to form punch 108 with a corrugated pressure side (or punches) also could be used to provide sintered articles with a corrugated, indented surface. However, utilization of mesh-type materials for making sintered abrasive articles with a corrugated, indented surface of up to 3 mm depth valleys is more economical than using corrugated punches.

Figure 25A:
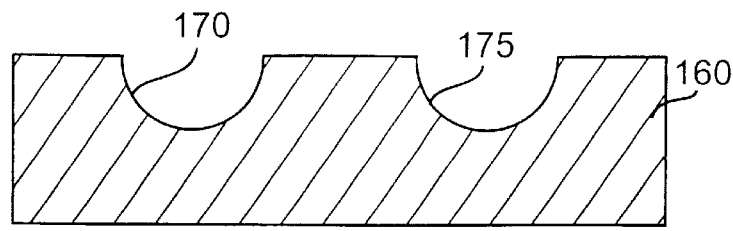
FIGS. 25A–C show individual segments.
Figure 25B:
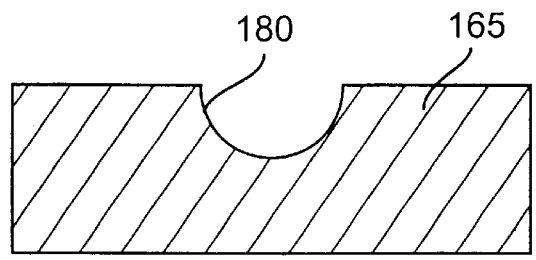
Figure 25C:
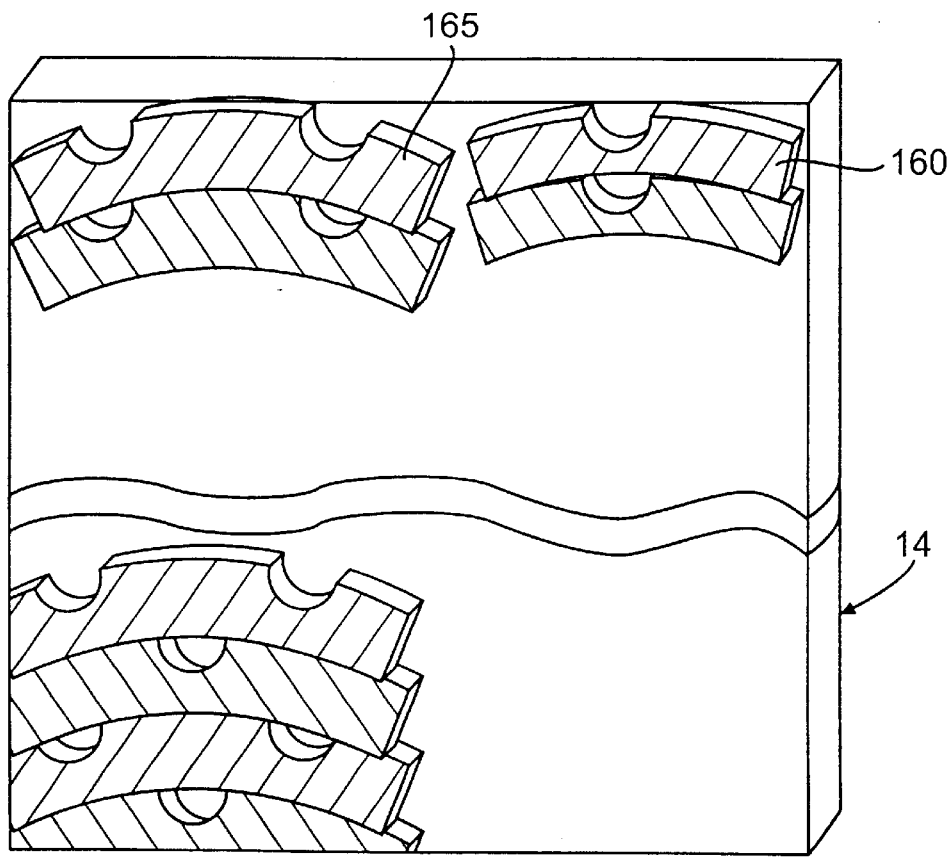

FIGS. 25A, B, & C show in general how segments of a sophisticated shape can be made according to the present invention. At the same time the figures illustrate a very specific case. FIGS. 25A and B specifically shows segments 160 and 165 for cut-off blades presently well-known and appreciated in the stone cutting and fabricating industries. Particularly, this shape of segments and blades furnished with these segments are manufactured and marketed by GranQuartz, Inc. of Tucker, Ga. As shown, these segments 160 and 165 comprise voids 170, 175, and 180 that provide easy cut performance of the blade furnished with these segments. According to the present invention, segments of this or other sophisticated profiles, specifically pair segments having substantially matching profiles (as segments 160 and 165) can be economically produced by cutting these segments out of sintered article 14 as shown in FIG. 25C.

Figure 26:
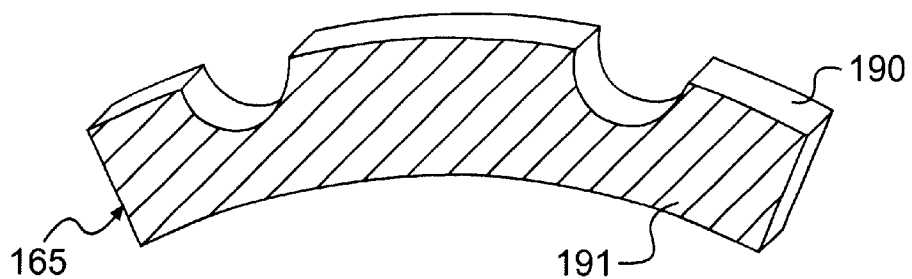
FIG. 26 shows a further segment.

Based on the above, one can see that an advantage of this invention is that an assembly of blocks, and, therefore, the resulting sintered workblank and the segments extracted therefrom can have outward portions with a higher concentration of hard particles (i.e., diamonds) and/or a different retaining matrix material than an inner portion of the segment. This is illustrated in FIG. 26 where the segment 165 has outer portions 190 having a higher concentration of abrasive or hard particles than an inner portion 191.

Figure 27:
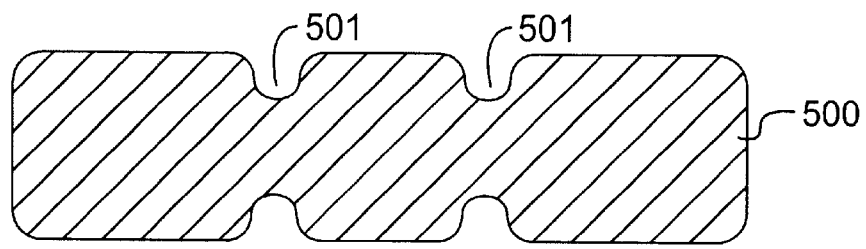
FIG. 27 shows a sintered article with grooves.

FIG. 27 shows a sintered article 500 with zones 501 which indicate grooves, indentations or low-density zone. This type of sintered article is purposely prepared by several ways (described below) to ease problems, if any, of extracting individual sintered bodies from the article. Extraction can take place substantially according to the zones. It is understood, that the zones 501 are stress points and therefore extracting by breakage will result in obtaining individual sintered bodies at least roughly corresponding to zones 501.

Further, the thickness of the sintered article is smaller in zones 501 and therefore cutting, i.e., by laser and water jet, will be more efficient if it goes through zones 501. In this way it is possible to obtain individual sintered bodies from diamond-metal sintered articles having an overall thickness of 7 mm with the zones 501 having a depth of 2 mm by cutting with a $CO_2$ laser of 1500 wt.

Figure 28A:
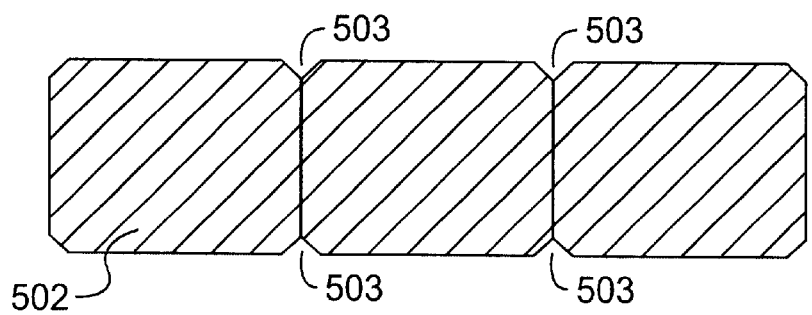
FIGS. 28A and B show methods for forming the article of FIG. 27.
Figure 28B:
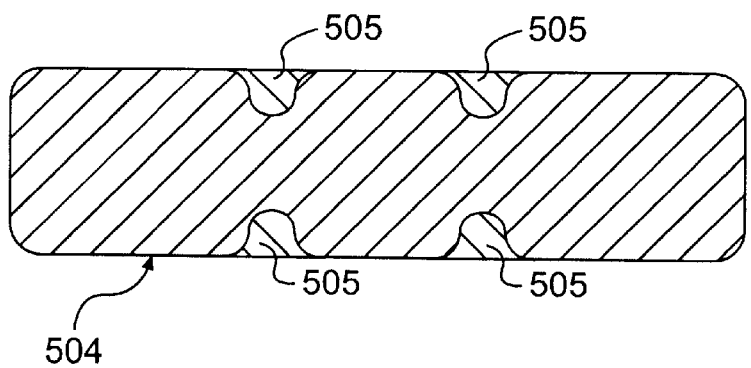

Zones 501 can be obtained by various ways, including, but not limited to, (a) abrasive and/or edge tool grinding and/or milling of the sintered article 500 resulting in grooves; (b) as shown in FIGS. 28A and B forming blocks 502 with chamfers 503, assembling them and then sintering the assembly into a sintered article 504 which will have zones of low density 505 at the location of the chamfers; (c) chamfering blocks mechanically or with an abrasive, assembling them and sintering the assembly into a sintered article having zones of low density as in (b); (d) forming indentations in the process of compacting and/or sintering under pressure with indentation means as shown, for example, in FIG. 24; and (e) any combination of the above, the best results being achieved when chambers are provided that correspond to the layout of the indentation means.

To substantially increase the productivity of manufacturing abrasive segments, articles, and tools according to the present invention, ideally a manufacturing facility would include means to compact and/or cast the powder, means to assemble the compacted blocks of the proper form and size into an assembly (with or without additional materials), means for sintering the assembly, preferably under pressure, and means for cutting the sintered article into the segments, preferably by laser or water jet cutting machines. A suitable sintering press for sintering the assembly of blocks is sinter press 18STV/250 of Robosintris Company (Piacenza, Italy). It has a maximum compacting force of 250 tons and can develop a pressure up to 387.5 $kg/cm^2$ on a surface of 645.16 $cm^2$ (254 mm×254 mm) and a uniform temperature distribution.

Productivity of sintering increases with an increase in the working square areas of the sinter mold and the number of the assembled blocks loaded into the mold. For example, the above-mentioned sinter press provides the capability of sintering up to 6 to 10 assemblies or plates of 254×254 mm×(0.5 to 4) mm thickness for 40–60 minutes depending on composition, cycle and temperature of sintering, and mold load. That translates into 156 segments of 35 mm×12 mm per plate. When sintering 4 to 6 plates of 3 mm thick per frame, it results (after cutting into segments) in productivity rate of 156×(4 to 6)=624 to 936 segments per frame or 15.6 to 23.4 segments per minute. At present, typically only about 40 individual segments per frame for about a 30-minute cycle are produced which translates into about 1.3 segments per minute. This invention therefore provides a significant increase in the productivity rate of the segments.

Variety types of laser and water jet machines can be utilized for extracting the sintered parts or segments.

In this invention a non-random distribution of hard or abrasive particles includes a distribution of the particles according to at least one algorithm, that can be the same or different in different areas, planes, volumes (i.e., high density and low density non-random distribution and/or a combination of hard particles of different types and/or sizes distributed in a non-random manner in different areas of the material); a non-random distribution of the single hard particles; or a nonrandom distribution onto at least one plane and/or in volume. Further, it can include a nonrandom distribution of conglomerates or clusters each comprising hard particles in which the particles can be randomly or non-randomly distributed in the conglomerates.

Therefore, any type of distribution of hard particles and means for achieving it are within the scope of the present invention.

The methods for providing a nonrandom distribution of hard particles and/or clusters of hard particles include but are not limited to utilization of mesh and/or crate type materials as taught in at least one of the above-mentioned U.S. Pat. Nos. 4,925,457, 5,049,165, 5,092,910, 5,380,390, 5,817,204, 5,620,489, 5,791,330, 5,980,678, and 5,190,568 the contents of which are incorporated herein by reference.

Therefore any methods, means, materials and/or fixtures (machines) providing non-random distribution of the hard particles and deriving products are within the scope of the present invention.

Hard and abrasive particles can be defined by many different ways. They can be a characterized relative to the matrix material wherein they are distributed as particles having a hardness, say two times higher than the matrix material. They can be characterized as particles having 7–10 Moose hardness. Hard and abrasive particles include, but are not limited to, diamonds, cubic boron nitride, garnet, carbides, nitrides, borides of metals and nonmetallic elements, such as but not limited to tungsten carbide, titanium nitride, boron carbide, cemented carbide (i.e., WC—Co), or any combination thereof etc. Diamonds can be of natural or synthetic origin and mono or polycrystal.

The blocks forming the assembly of blocks as well as the individual extracted bodies can be substantially one-, two-, and three-dimensional bodies. Examples of substantially one-dimensional bodies (i.e., .10 mm thickness×1 mm width×10 mm length) are an extracted strip of sinterable material (i.e., 0.30 mm thickness×1 mm width×10 mm length) and a sintered strip or pin (i.e., 0.30 mm thickness×1 mm width×10 mm length), obtained by extracting the strip or pin out of a sintered article. Examples of substantially two-dimensional bodies include cast powder tape or roll (i.e., 0.30 mm thickness×100 mm width×5000 mm length) or a sintered plate extracted from the sintered article i.e., 0.30 mm thickness×100 mm×100 mm). Examples of substantially three-dimensional bodies include blocks (i.e., 0.30 mm×20 mm x 7–10 mm) and a sintered plate (i.e., 100 to 250 mm×100 to 250 mm×100 to 250 mm).

The blocks or preforms forming the assembly may include individual, three dimensional, stackable bodies which tile the two dimensional (X, Y) plane perpendicular to the direction of pressing, Z, such that at least one of the X or Y axes traverses multiple preforms. Alternatively, multiple preforms may traverse both the X and Y and/or also the Z axis.

Further, the preforms may comprise X, Y planar elements which include deposits within the plane such that at least one of the X or Y axes traverses at least two matrix compositions. Successive contiguous layers of preforms in the Z direction, if present, may be the same or different. In either case, the Z axis may traverse either a homogeneous, a heterogeneous, or a compositionally variable body after sintering. If the preforms are flexible and substantially planar, they may be combined with preforms having mating contours about the Z axis to provide a sintered object with nonplanar distributions of the initially planar components. It is not required that all of the elements of a single layer of preforms be coplanar. Individual elements may have a surface above or below the plane of the nominal surface of a layer. For example, a layer of thickness t may include elements of thickness 2t which mate with corresponding voids in adjacent layers to create a continuous solid upon assembly.

The blocks may have an outer portion that is different from the inner portion. By way of example, the block can be a green compact of Cooper powder as an outer portion and an inner portion that is a green compact of Cobalt powder; or an outer portion of cast powder steel and an inner portion a green compact of Bronze powder; or an outer portion that is a mesh (i.e., steel) and an inner portion that is green compact of a powder; or the mesh can be replaced with a steel shim. These parts of the block can be compacted simultaneously into the block and/or be assembled.

U.S. Pat. No. 5,791,330 to the inventor discloses utilization of laser, water jet and electrical discharge for extracting useful abrasive parts (segments, articles) from sintered abrasive plates. U.S. Pat. No. 5,980,768 to the inventor discloses a method for making materials with intentionally no-hard particles zones. It should be understood that cutting through a no-hard particles zone presents less problems and is more efficient than cutting through a zone containing hard particles. Also, the presence of a no-hard particle zone within the abrasive segment and/or article provides more efficient ways for dressing, mounting and fixing a sintered material and abrasive segment to the carrier (core) of an abrasive tool. Welding (including laser and electronic beam welding, specifically in case of utilization of diamonds as the hard particles), brazing and adhering (gluing) is more feasible and reliable when applied to a no-hard particle zone rather than to a hard particle zone.

Figure 29:
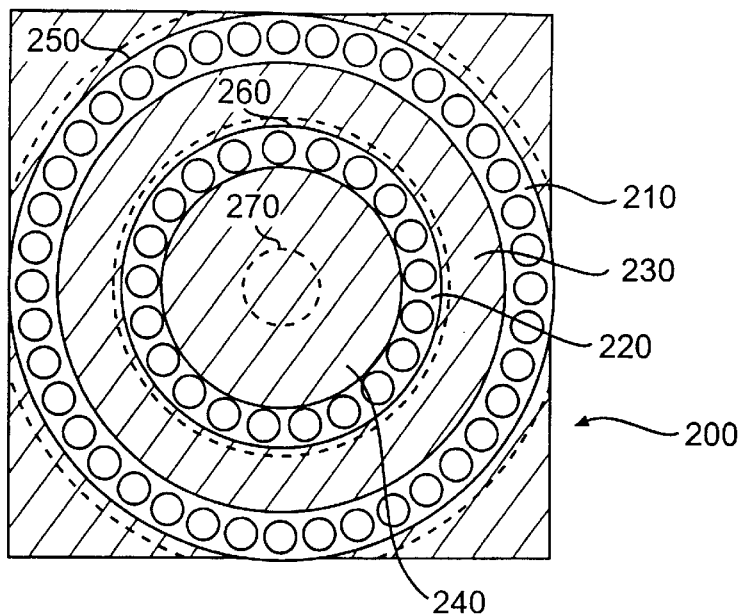
FIG. 29 shows a sintered plate having no particle zones or foot areas.

Examples of tools utilizing the so-called "foot" are shown in FIGS. 29, 30, 31, and 32. FIG. 29 shows a sintered plate 200 (having here a square shape) with hard particle containing rims 210 and 220 and no-hard particle containing "foot" rims or ring 230 and a center disc 240. Lines 250, 260, and 270 show how this sintered plate 200 can be cut into discs.

Figure 31:
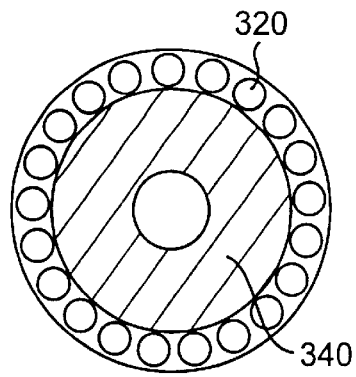
FIG. 31 shows a further segment cut from the plate of FIG. 29.
Figure 30:
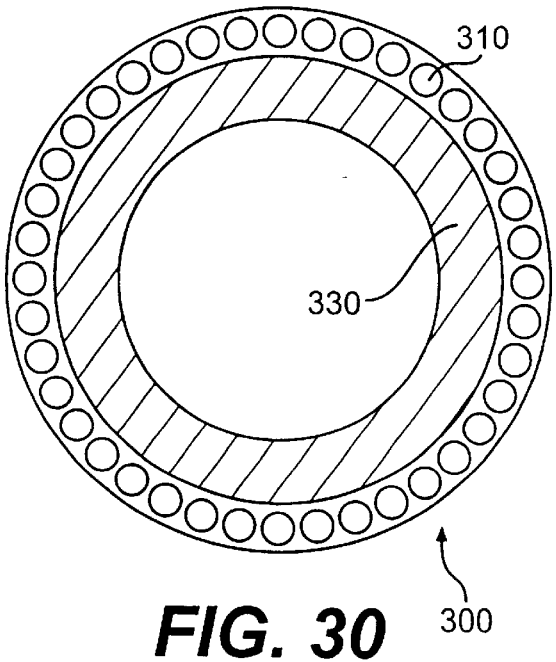
FIG. 30 shows a segment cut from the plate of FIG. 29.

FIG. 30 shows the extracted abrasive disc 300 derived from sintered plate 200 as a result of cutting this plate along lines 250 and 260. FIG. 31 shows the extracted abrasive disc 305 derived from sintered plate 200 as a result of cutting this plate along lines 260 and 270. These extracted abrasive donuts 300 and 305 comprise abrasive areas 310 and 320 substantially corresponding to abrasive rims 210 and 220, and "foot" areas 330 and 340 substantially corresponding to foot rim 230 and "foot" disk 240.

Figure 32:
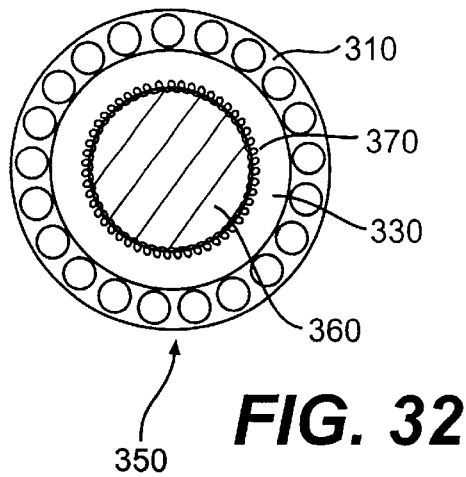
FIG. 32 shows the segment of FIG. 30 mounted on the core of a tool.

FIG. 32 shows an abrasive disk-type tool 350, wherein abrasive disc 330 is mounted (by, for example, laser welding 370 or press fit) onto a core 360. If necessary, the abrasive discs and/or foot areas can be dressed or otherwise machined before joining with the core. One can see that this invention offers a very efficient way of manufacturing disk-type abrasives by extracting donut-type sintered abrasive blanks out of a sintered plate and joining these discs on a core. The presence of braising and/or welding friendly (compatible) "feet" assures reliable joining (fixing) the abrasive rim with the core through the foot by braising and/or welding. Also, if a foot is not needed, it could be eliminated in the process of assembling the blocks prior to sintering or cut-off during extracting the abrasive rim out of the sintered plate. One can readily appreciate that various tools can be produced by this method, including, but not limited to, composite cut-off discs, grinding disc, grinding wheels, etc.

Figure 33E:
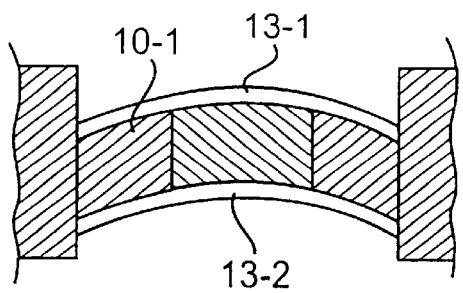
Figure 33E:
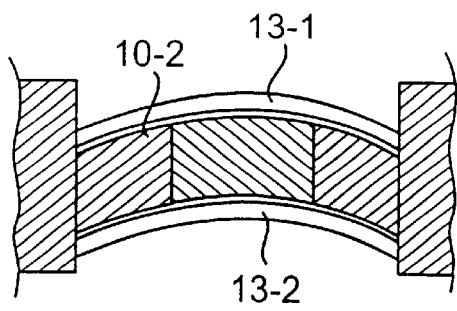
Figure 33E:
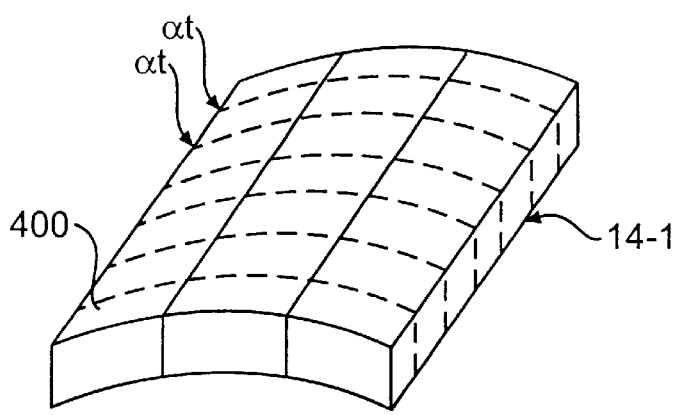
Figure 33E:
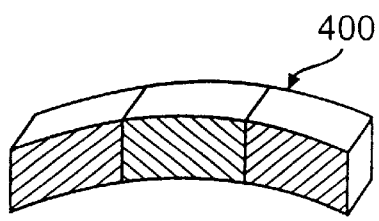
Figure 33E:
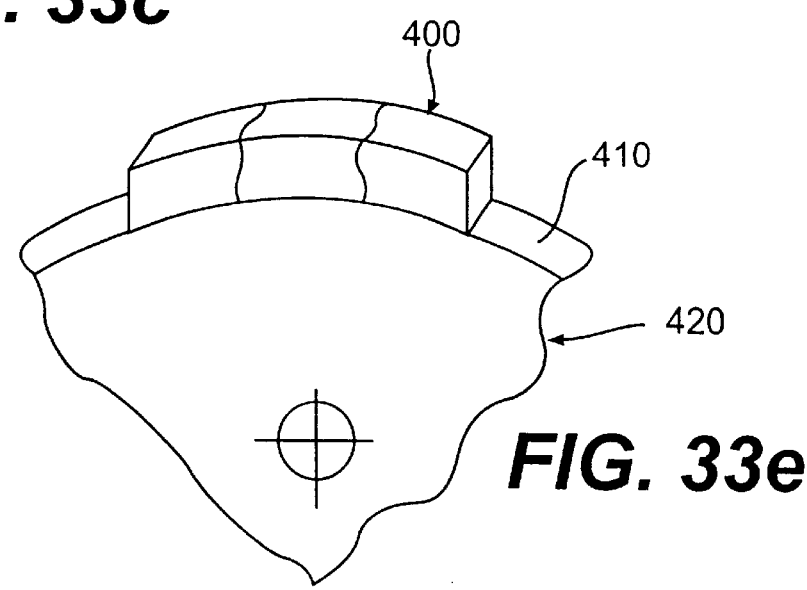

Another approach of matching a profile of a tool carrier is shown in FIGS. 33a and b. With a reference to FIGS. 5–9 and others, FIGS. 33a and b show punches 13-1 and 13-2 having an arc shape, therefore resulting in a block 14-1 (re: FIGS. 8 and 9) having an arc shape. One of the punches, i.e., the bottom punch 13-2 should closely correspond and in the best case, matches the profile of the tool carrier. The block 14-1 is cut as shown in FIG. 33c into bodies/segments 400 as shown in FIG. 33d that are mounted onto the working edge 410 of a tool carrier 420 as shown in FIG. 33e, which illustrates a case of making a circular cutting blade.

The difference between FIGS. 33a and b is the shape of the blocks 10-1 and 10-2. FIG. 33a illustrates blocks 10-1 of rectangular shape, while FIG. 33b illustrates blocks 10-2 having an arc shape opposite (and generally fitting) to the arc of punch 13-1.

Figure 34A:
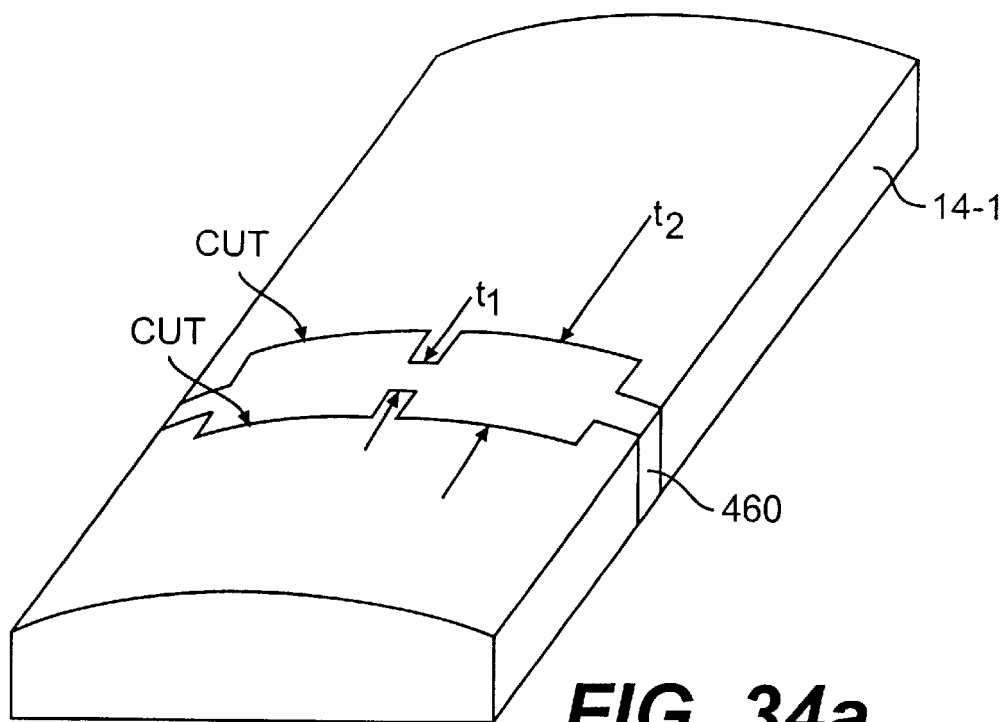
FIGS. 34a and b show yet a further form of article and segments.

FIGS. 34a and b illustrate that this invention can provide tools 450, in this case a curricular blade, and a method for making it, wherein extracted segments 460 have different thicknesses $1_1$ and $t_2$ along the direction of machining of a workpiece by the tool (i.e., cutting). Segments with different thickness sections (and therefore resulting in different protrusion over the carrier) provide advantages for effective removal of workpiece debris and easy cutting.

Segments comprising a variety of the sections (at least more than two) with different thickness can be made according to the present invention as easy as a segment with a uniform thickness.

It should be understood that the thickness of the segment is defined by the extraction means, i.e., laser or water jet cut, accuracy of the cut and the layover (map) of the cut. In cases illustrated by FIGS. 33a–e and 33a–34b, the thickness of the segments (and eventually, effective thickness of the abrasive tool and width of the cut kurf) is controlled by the way of extracting the segments (cut) but not by the thickness of the sintered plate. This constitutes another substantial advantage of this invention.

Figure 35A:
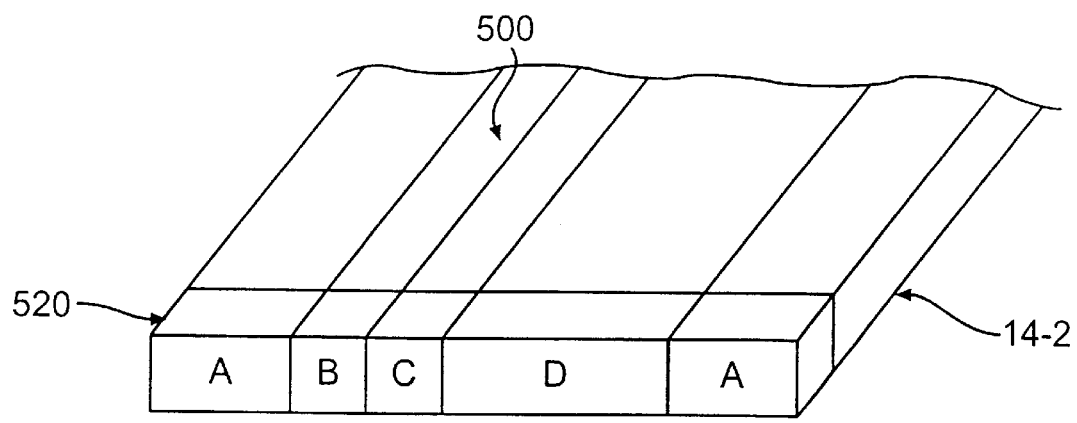
FIGS. 35a an b show another sintered article and segments extracted from the article.

It should be understood that at least two pluralities of blocks can be assembled together and sintered into a plate or article. FIG. 35a illustrates the assembly 14-2 comprising blocks A (two blocks), B, C, and D. Overall composition of the block 14-2, retention matrix composition, type of hard particles, size, distribution, methods and randomness of distribution, concentration of hard particles within the retention matrix, dimensions and other parameters and factors can constitute a certain plurality of the segments. What is important to note is that segments representing different pluralities can be assembled into the plate 14-2 in a desired, including non-random, manner. After sintering the assembly 14-2 into a plate 500 (i.e., a flat or arc type), then extracting the segments 520 out of the sintered plate 500, then fixing the extracted segment 520 onto a tool carrier 530, one can obtain an article (a tool) 540 with segments 520 comprising alternating (non-randomly, if desired) sections A, B, C, D of different plurality (derived from the blocks of different pluralities).

Figure 35B:
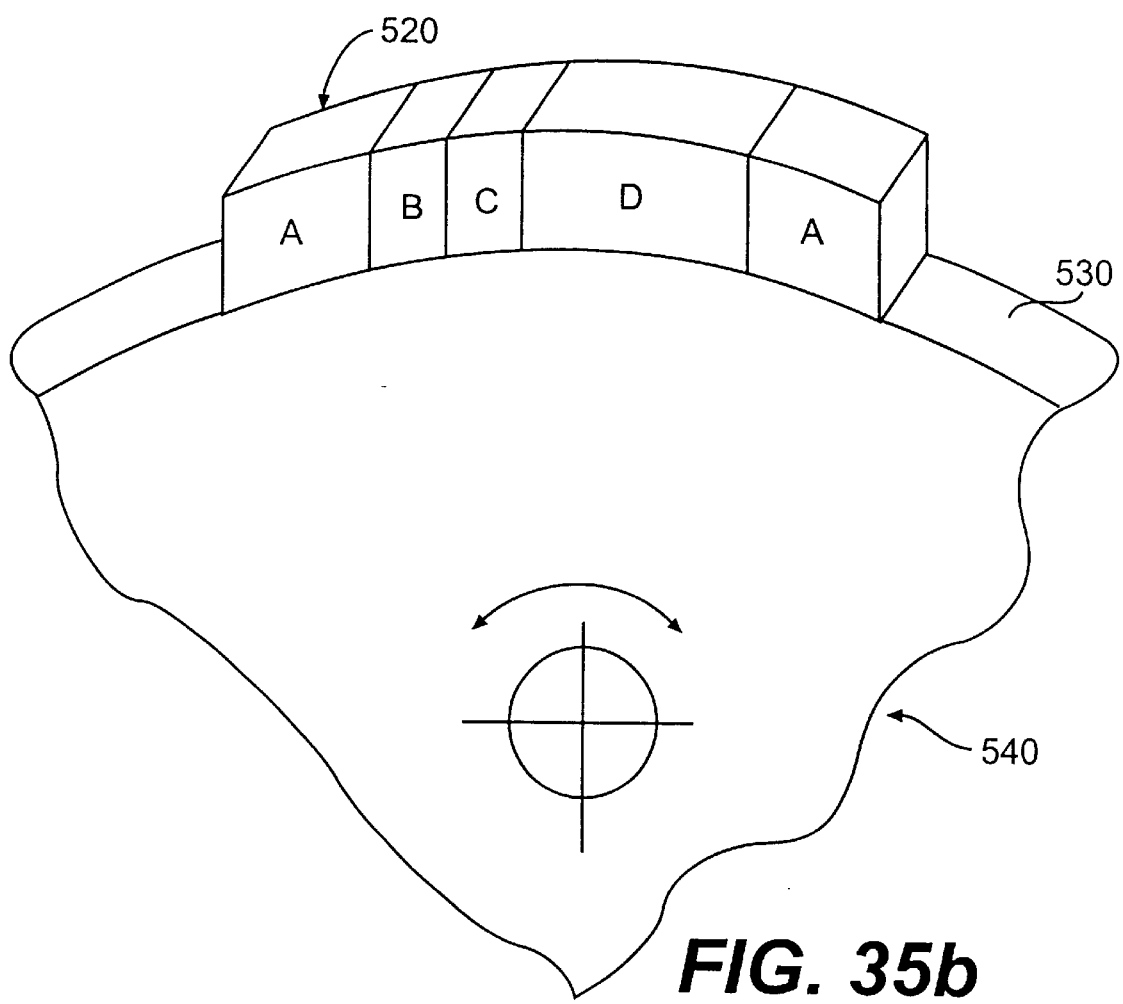

By way of example, tool 540 is shown in FIG. 35b as a curricular blade. The number of the sections in the segments is not limited but is usually 2 to 5. Different segments of the tool may comprise different pluralities of the blocks and/or different sequences of the blocks, and/or different numbers of the blocks in the segment.

Figure 34B:
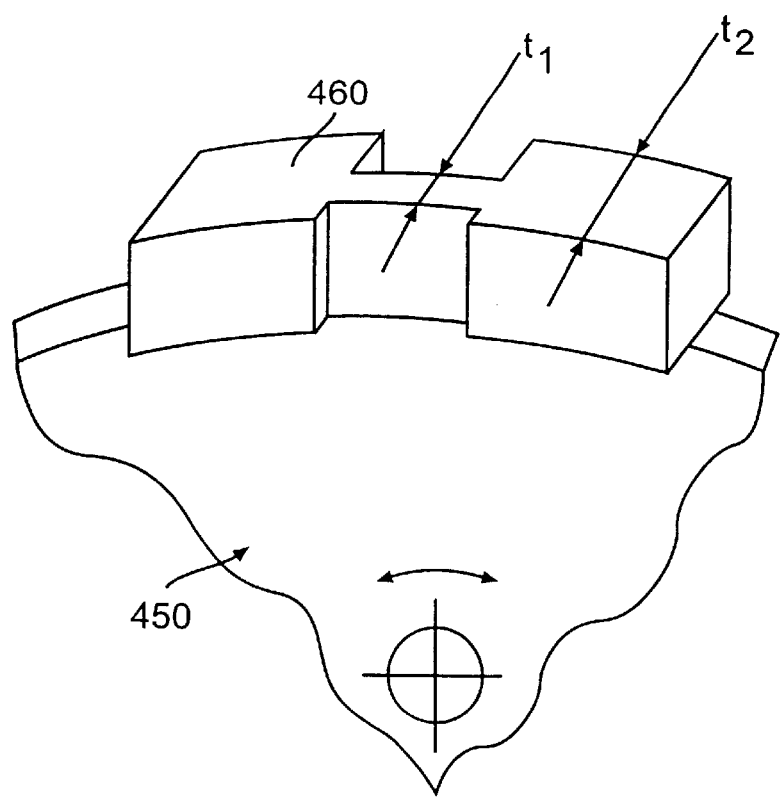

It should be noted purposely and/or non-randomly distributed blocks and their sequence within the segment might or might not coincide with sections of different thickness of the segment as it is shown in FIGS. 34a–b.

Means for cutting the sintered individual bodies out of sintered plates or articles include but are not limited to $CO_2$ laser cutting machines of 1500 to 2500 wt. They can cut diamond-metal sintered plates up to 7 mm thick with a practical speed of 3.0 to 180 inch per minute depending on the thickness of the plate, the concentration of diamonds in the matrix and the matrix composition. YAG laser machines can cut even thicker plates. Suitable laser cutting machines are manufactured by Mitsubishi (Japan); Laser Machining, Inc. (Minnesota, USA); Ruffin-Sinar (Italy); and Western Saw (California, USA). Also water jet cutting machines equipped with 10,000 psi pump. They can cut diamond-metal sintered plates up to 5 mm thick with a speed of 0.3 to 150 inch per minute depending on the thickness of the plate, the concentration of diamonds in the matrix and the matrix composition. Suitable wet jets are manufactured by the Jet-Cut Company (Minnesota).

The invention will now be further described with reference to the following examples in which:

for room temperature compaction and sintering under pressure, the press used was 18STV/250 of Robosintris Company, Piacenza, Italy;

the "green" blocks of rectangular shape [30 mm×20 mm×(7–10) mm] were compacted under a pressure of 3,000 kg/cm$^2$;

the plane surface of the assembly (perpendicular to the direction of compaction), and therefore the corresponding dimensions of the working zone of the sinter mold, was 90 mm×60 mm;

the abrasive (hard) particles were man-made diamonds of 40/50 mesh, grade 970 produced by Superabrasive Division of General Electric;

individual sintered segments were extracted from the sintered article by laser cutting with a Laser Machining Center, Newnan, Georgia and Co$_2$ laser with 1500 wt. power of Mitsubishi or by wet jet cutting with 10,000 psi pump and abrasive media 80-mesh garnet; and a conventional sinter mold was used comprising a metal frame, thermal/electric insulators and graphite plates. The maximum pressure at maximum sintering temperature was 350 to 400 kg/cm and the time of sintering under maximum pressure and maximum sintering temperature was 5 min.

In each of the examples, the assembly of "green" blocks was positioned in the sinter mold in a "flat" manner, meaning that the larger size facet of the assembly of the "green" blocks is oriented in the mold (and/or the mold is oriented within the sinter press) so that compacting pressure is perpendicular to it.

EXAMPLE 1

A mixture of cobalt powder "400" of Afrimet Company with 4 wt. % of a mineral oil was prepared and then compacted into "green" blocks. The "green" blocks were split into six batches.

Blocks of each batch 1, 2, and 3 were assembled separately into single layer assemblies as shown in FIG. 4. The overall size of each assembly, and therefore the size of the working zone of the sinter mold was 90 mm×60 mm. Each assembly was sintered at a different temperature. Each assembly was sintered as a single layer as shown in FIG. 5 resulting in sintered articles as shown in FIG. 6. The assembly of batch 1 was sintered at 950° C. The assembly of batch 2 at 980° C. and the assembly of batch 3 at 1010° C., resulting respectively in sintered articles 1, 2, and 3.

After sintering, all sintered articles were mechanically crashed by impact.

Sintered article 1 was distracted along the joint lines of the blocks with some cracks propagating through the sintered article. Some individual segments extracted by this crashing had rough fractured surfaces and inconsistent, but substantially rectangular sizes close to 30 mm×20 mm.

Sintered article 2 was distracted primarily through the sintered article with some cracks along the joint lines of the blocks. No individual segments that would correspond to the "green" compacted block were obtained.

Sintered article 3 was distracted through the sintered article with no cracks along the joint lines of the blocks. No individual segments that would correspond to the "green" compacted block were obtained. Pieces of random and irregular size and shape were obtained as the result of this crashing.

The assemblies were sintered in the solid state with no liquid phase being present.

Metallurgical analysis of the sintered articles show distinguishable borderlines between most of the original "green" blocks in sintered plate 1, distinguishable borderlines between a few of the original "green" blocks in sintered plate 2, and no distinguishable borderlines between the original "green" blocks of sintered plate 3.

EXAMPLE 2

"Green" blocks of batches 4, 5, and 6 (see EXAMPLE 1) were assembled as shown in FIG. 21 and sintered as shown in FIG. 22 (but only with one layer of assembled blocks between the punches). A flexible cast powder sheet 90 mm×60 mm used as the additional material 44. Two layers of Graphoil sheets of 90 mm×60 mm×0.381 MM (0.015") thick each were used as separator 100 between the assembled block 14 of "green" compact blocks with the cast powder sheets 44 on (not shown in FIG. 22) and the punches. The powder composition of the cast sheets 44 was 90 wt. % Cooper +10 wt. % tin (bronze powder "201" of ALCAN Company). The same sintering procedures were used. Sintered article 4 was sintered at 950° C., article 5 at 980° C., and article 6 at 1000° C. Then all these sintered plates were crashed.

Sintered plate 4 had visible residuals of bronze on its surface wherein the cast powder sheet was applied against it. This plate 4 was distracted primarily along the joint lines of the blocks with some cracks propagating through the sintered article.

Some individual segments obtained by this crashing had rough fractured surfaces and inconsistent, but substantially rectangular sizes close to 30 mm×20 mm. Sintered articles 5 and 6 shows complete infiltration of the bronze during sintering into the material of the blocks although plate 6 lost a substantial portion of the bronze due to melting and leaking of the molten material into the sinter frame. Sintered articles 5 and 6 were crashed into pieces of random and irregular size and shape.

Metallurgical analysis of the sintered articles show distinguishable borderlines between most of the original "green" blocks in sintered article 4 but no distinguishable borderlines between the original "green" blocks of sintered articles 5 and 6.

Sintered plate 4 was sintered in the solid state, while sintered plates 5 and 6 were sintered with the presence of a liquid phase generated by the bronze that infiltrated into the articles 5 and 6 during sintering.

EXAMPLE 3

A mixture of 97 wt. % of Cobalt powder "400 and 3 wt. % of Bronze powder "201" (90 wt. % of Cooper and 10 wt. % of tin) was prepared. 4 wt. % of a mineral oil was added in the process of mixing. The mixture was then compacted into "green" blocks and the blocks were split into three batches 7, 8, and 9.

Figure 23B:
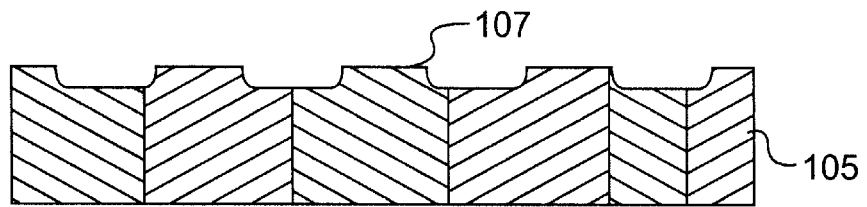

The blocks of each batch 7, 8, and 9 were assembled as shown in FIG. 23 (i.e., into two-layer assembles with three two-layer assemblies per sinter frame). The assembly of batch 7 was sintered at 950° C., the assembly of batch 8 at 980° C., and the assembly of batch 9 at 1010° C., resulting respectively in sintered articles 7, 8, and 9.

After sintering, all sintered articles were mechanically crashed by impact.

Sintered article 7 was distracted substantially along the joint lines of the blocks with some cracks propagating through the sintered article. Most of individual segments obtained by this crashing comprised rough fractured surfaces and inconsistent, but substantially rectangular sizes close to 30 mm×20 mm.

Sintered articles 8 and 9 were distracted through the sintered article. No individual segments corresponding at least roughly to the original "green" blocks were obtained by this crashing. Only pieces of random and irregular size and shape were obtained as the result of this crashing.

Sintered article 7 was sintered in the solid state, while sintered articles 8 and 9 were sintered with presence of a liquid phase generated by the bronze.

Metallurgical analysis of sintered articles 8 and 9 show no distinguishable borderline between original "green" blocks.

EXAMPLE 4

In this example, the blocks were two-sided sandwich blocks having an outer layer of 30 concentration of diamonds in a powder matrix of 94 wt. % of Cobalt 400 produced by Afrimet) and 7 wt. % of diamond setting powder #11 (Cu 24–26; Fe 22–26; Ni 15–20; Sn 2–5; Cr 5–8; B 1–3; Si 1–4; WC 20–35; and Co 1–2 all in wt. % produced by Wall Colmonly Company. 4 wt. % of a mineral oil was added in the process of mixing. The inner was 25 concentration of diamonds in a powder matrix 93 wt. % of Cobalt 400 produced by Afrimet and 7 wt. % of diamond setting powder #50 (Cu 20–25; Fe 20–25; Ni 30–45; Sn 1–4; Cr 7–11; B 1–4; and Si 1–4; all in wt. %) produced by Wall Colmonly Company and 4 wt. % of a mineral oil. The blocks were assembled in a single-layer assembly as shown in FIG. 4 and sintered in four-level stock as conceptually shown in FIG. 22.

The sintering temperature was 1040° C.

The sintered articles of 3.25–3.55 mm thickness were cut into segments by laser and water jet regardless of the layout of the "green" blocks. Therefore some segments comprised sections of at least two sintered "green" blocks. The segments were used to make a four inch diameter segmented blade and face grinding tool for machining concrete. The tools demonstrated respectable performance without breakage of the individual segments.

EXAMPLE 5

A mixture of 25 concentration of diamonds in a powder matrix 93 wt. % of Cobalt powder 400 (of Afrimet Company) and 7 wt. % of Composition 50 (Wall Colmonly Company) with 4 wt. % of a mineral oil was prepared, compacted into green blocks and assembled into a single layer assembly.

Cast powder tape comprising diamonds with a powder composition of 93 wt. % of Cobalt powder 400 of Afrimet Company and 7 wt. % of Composition 11 (Wall Colmonly Company) were prepared. One cast tape had randomly distributed diamonds of 30 concentration and a second cast tape had non-randomly distributed diamonds of concentration 7. The tape was cut into 90 mm×60 mm plates and positioned onto the top and the bottom of each assembly prior to sintering. First, a cast powder was put into the mold, then the "green" blocks were put together to form the single-layer assembly and then another plate of the cast tape was put on top of the assembly.

The sintering temperature was 1040° C.

The sintered articles of 3.0–3.25 mm thickness were cut into segments by laser and water jet regardless of layout of the "green" blocks. Therefore some segments comprised sections of at least two sintered "green" blocks. The segments were used to make a four inch diameter segmented blade and face grinding disc for machining concrete. The tools demonstrated respectable performance without breakage of individual segments.

EXAMPLE 6

Example 5 was repeated with additional material for a "foot". "Green" compact blocks with no diamonds were used. The dimension of these blocks was 15 mm length×2.5 mm thickness and the height of the blocks was conformed to the thickness of the assembly. The compositions of these blocks was 95 wt % of cobalt, 2 wt. % nickel, 2 wt. % iron, and 1 wt. % of Wall Colmonly Composition 50. The no-diamond blocks were placed between green blocks of example 5 as shown in FIG. 11. The opening of the mold was adjusted to accommodate the resulting assembly of larger size. The same plate of cast powder with non-randomly distributed diamonds therein was placed on the top and bottom of the assembly.

The assembly was then sintered under pressure and then cut into individual sintered segments for a four inch diameter blade which were fixed to the steel core of a tool as illustrated in FIG. 11c.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method for making a sintered article comprising providing a plurality of individual blocks of sinterable matrix material, arranging said blocks in abutting relationship to form an assembly of said blocks, wherein said assembly comprises a plurality of said blocks extending in more than one direction thereof, and thereafter sintering said assembly to form an integrated sintered article.

2. A sintered article made by the method of claim 1.

3. The method of claim 1, wherein said assembly has an X, Y, and Z axis at right angles to one another and comprises a plurality of said blocks extending along at least two of said axes thereof.

4. The method of claim 1, wherein said sintered article is a sintered abrasive article, at least one of said blocks of sinterable matrix material containing a plurality of abrasive particles embedded therein.

5. The method of claim 4, wherein all of said blocks contain a plurality of abrasive particles.

6. The method of claim 4, wherein said at least one block of sinterable matrix material has a plurality of abrasive particles embedded therein in a non-random pattern.

7. The method of claim 6, wherein a plurality of said blocks of sinterable matrix material have a plurality of abrasive particles embedded therein in a non-random pattern.

8. The method of claim 7, wherein all of said blocks of sinterable matrix material have a plurality of abrasive particles embedded therein in a non-random pattern.

9. The method of claim 4, wherein said at least one block of sinterable matrix material has a plurality of abrasive particles embedded therein in a random manner.

10. The method of claim 9, wherein a plurality of said blocks of sinterable matrix material have a plurality of abrasive particles embedded therein in a random manner.

11. The method of claim 4, wherein a plurality of the blocks have a plurality of abrasive particles embedded therein in a non-random pattern and a plurality of the blocks have abrasive particles embedded therein in a random pattern.

12. The method of claim 4, wherein the plurality of abrasive particles are embedded in the block before sintering.

13. The method of claim 4, wherein the plurality of abrasive particles are embedded in the block during sintering.

14. The method of claim 6, wherein said plurality of abrasive particles are embedded in a non-random pattern in the block of sinterable matrix material by means of a mesh material.

15. The method of claim 14, wherein the mesh material is incorporated in said at least one block and forms a part of said article.

16. The method of claim 4, wherein at least one of said blocks of sinterable matrix material contains no abrasive particles.

17. The method of claim 16, wherein a plurality of said blocks of sinterable matrix material contain a plurality of abrasive particles and a plurality of said blocks contain no abrasive particles, the blocks containing no abrasive particles being interspersed between the blocks containing abrasive particles in the assembly.

18. The method of claim 3, wherein said assembly has a plurality of said blocks extending along two axes thereof.

19. The method of claim 3, wherein said assembly has a plurality of said blocks extending along all three axes thereof.

20. The method of claim 3, wherein said assembly comprises a single layer of blocks having a plurality of blocks extending along both the X and Y axes thereof, the joints between adjacent blocks in at least one of said axes being staggered with respect to one another.

21. The method of claim 3, wherein said assembly comprises a plurality of layers of blocks having a plurality of blocks along the X, Y, and Z axes thereof, the joints between adjacent blocks in at least one of said axes being staggered with respect to one another.

22. A method for making at least one sintered abrasive body comprising providing a plurality of individual blocks of sinterable matrix material at least some of which contain a plurality of abrasive particles, arranging said blocks in abutting relationship to form an assembly of said blocks, wherein said assembly comprises a plurality of said blocks extending in more than one direction thereof, thereafter sintering said assembly to form an integrated sintered abrasive article, and extracting at least one sintered abrasive body containing abrasive particles from said sintered abrasive article.

23. The method of claim 22, wherein the sintered article has at least one surface corresponding to the shape of a core or carrier of an abrasive machining tool so that the abrasive bodies extracted from the article will have a surface that can be fixed to the carrier or core of the abrasive tool.

24. The method of claim 22, wherein said assembly has an X, Y, and Z axis at right angles to one another and comprises a plurality of said blocks extending along at least two of said axes thereof.

25. The method of claim 22, wherein all of said blocks contain a plurality of abrasive particles.

26. The method of claim 22, wherein the blocks of sinterable matrix material containing a plurality of abrasive particles have the particles embedded therein in a non-random pattern.

27. The method of claim 22, wherein the blocks of sinterable matrix material containing a plurality of abrasive particles have the particles embedded therein in a random manner.

28. The method of claim 22, wherein some of the blocks of sinterable matrix material containing a plurality of abrasive particles have the particles embedded therein in a non-random pattern and some have the particles embedded therein in a random manner.

29. The method of claim 22, wherein some of the blocks of sinterable matrix material contain no abrasive particles.

30. The method of claim 29, wherein the blocks containing no abrasive particles are interspersed between the blocks containing abrasive particles.

31. The method of claim 22, wherein the step of extracting an abrasive body from said abrasive article comprises cutting said article by means of laser cutting, water jet cutting, electrical erosion cutting or combinations thereof.

32. The method of claim 31, wherein the abrasive article is cut out to provide said at least one abrasive body by laser cutting.

33. The method of claim 31, wherein said abrasive body is cut into a shape to be fixed to a core or carrier of an abrasive machining tool.

34. The method of claim 33, wherein the abrasive body is affixed to the core or carrier of the abrasive tool.

35. The method of claim 34, wherein the abrasive body is fixed to the core by welding, laser welding, brazing, gluing, or combinations thereof.

36. The method of claim 22, wherein a plurality of abrasive bodies are extracted from the sintered abrasive article.

37. The method of claim 1 or 22, wherein the assembly of blocks is sintered under pressure.

38. The method of claim 37, wherein the plurality of blocks extend at least in the direction to which pressure is applied to the assembly during sintering.

39. The method of claim 1 or 22, wherein the assembly is sintered in a sinter mold and the blocks of the assembly are arranged outside of the sinter mold.

40. The method of claim 1 or 22, wherein the assembly is sintered in a sinter mold and the blocks of the assembly are arranged in the sinter mold.

41. The method of claim 1 or 22, wherein the blocks have a substantially rectangular shape.

42. The method of claim 1 or 22, wherein the assembly has a substantially rectangular shape.

43. The method of claim 1 or 22, wherein the sintered article has a substantially rectangular shape.

44. The method of claim 1 or 22, wherein the assembly has a substantially square shape.

45. The method of claim 1 or 22, wherein the sintered article has a substantially square shape.

46. The method of claim 1 or 22, wherein at least one of the blocks or the assembly of blocks has a through opening to provide at least one through opening in the sintered article.

47. The method of claim 1 or 22, wherein the blocks of sinterable matrix material are of at least two different compositions.

48. The method of claim 1 or 22, wherein at least some of the blocks are composite blocks comprising at least two portions of different compositions.

49. The method of claim 48, wherein the composite blocks comprise at least two layers of different compositions.

50. The method of claim 4 or 22, wherein the abrasive particles are at least twice as hard as the sinterable matrix material of the blocks.

51. The method of claim 4 or 22, wherein the abrasive articles have a 7 to 10 Moh's hardness.

52. The method of claim 1, including extracting at least one sintered body from said sintered article.

53. The method of claim 22, wherein at least one dimension of the extracted body varies through the body.

54. A sintered abrasive article made by the method of claim 4.

55. A sintered abrasive body made by the method of claim 22.

56. An abrasive machining tool made by the method of claim 34.

57. An abrasive machining tool made by the method of claim 35.

58. The abrasive machining tool of claim 56 or 57, wherein said tool is a cutting tool, drilling tool, grinding tool, chamfering tool, gripping tool, a face-grinding tool, cylindrical tool, or a wheel.

59. The method of claim 29 or 30, wherein the abrasive body is extracted from the sintered article through a part of the article containing no abrasive particles.

60. The method of claim 59, wherein the abrasive body extracted from the article has a shape to be fixed to a core or carrier of an abrasive machining tool.

61. The method of claim 60, wherein the abrasive body is affixed to the core or carrier of the abrasive tool.

62. An abrasive machining tool made by the method of claim 61.

63. The method of away one of claims 16, 17, 29, or 30, wherein blocks comprising no abrasive particles are distributed among blocks comprising abrasive particles according to a chosen algorithm.

64. The method of away one of claims 16, 17, 29, or 30, wherein blocks comprising no abrasive particles are distributed among blocks comprising abrasive particles in a non-random manner.

65. The method of claim 22, wherein the dimensions of the extracted body are predominately consistent throughout the body.

66. The method of claim 53, wherein a variation of at least one dimension throughout the body corresponds to a chosen algorithm.

67. The method of claim 53, wherein-a variation of at least one dimension throughout the body is non-random.

* * * * *

UNITED STATES PATENT AND TRADEMARK OFFICE
CERTIFICATE OF CORRECTION

PATENT NO. : 6,453,899 B1
DATED : September 24, 2002
INVENTOR(S) : Naum N. Tselesin It is certified that error appears in the above-identified patent and that said Letters Patent is hereby corrected as shown below:

Column 24,
Line 8, change "away" to -- any --.
Line 12, change "away" to -- any --.
Line 23, "wherein-a" should read -- wherein a --.

Signed and Sealed this

Fourth Day of February, 2003

JAMES E. ROGAN
*Director of the United States Patent and Trademark Office*